(12) United States Patent
Sakairi et al.

(10) Patent No.: US 11,428,982 B2
(45) Date of Patent: Aug. 30, 2022

(54) ELECTRODE STRUCTURE, METHOD FOR MANUFACTURING ELECTRODE STRUCTURE, LIQUID CRYSTAL DISPLAY ELEMENT, METHOD FOR DRIVING LIQUID CRYSTAL DISPLAY ELEMENT, AND ELECTRONIC EQUIPMENT

(71) Applicants: SONY CORPORATION, Tokyo (JP); SONY SEMICONDUCTOR SOLUTIONS CORPORATION, Kanagawa (JP)

(72) Inventors: Takashi Sakairi, Kanagawa (JP); Koichi Amari, Tokyo (JP); Tomoaki Honda, Tokyo (JP); Tsuyoshi Okazaki, Tokyo (JP)

(73) Assignees: SONY CORPORATION, Tokyo (JP); SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/250,290

(22) PCT Filed: May 31, 2019

(86) PCT No.: PCT/JP2019/021724
§ 371 (c)(1),
(2) Date: Dec. 28, 2020

(87) PCT Pub. No.: WO2020/008765
PCT Pub. Date: Jan. 9, 2020

(65) Prior Publication Data
US 2021/0263378 A1   Aug. 26, 2021

(30) Foreign Application Priority Data

Jul. 4, 2018   (JP) .............................. JP2018-127247

(51) Int. Cl.
G02F 1/1335   (2006.01)
G02F 1/1343   (2006.01)
G09G 3/36    (2006.01)

(52) U.S. Cl.
CPC .. *G02F 1/133555* (2013.01); *G02F 1/134336* (2013.01); *G09G 3/3696* (2013.01)

(58) Field of Classification Search
CPC ............ G09G 3/3696; G02F 1/133555; G02F 1/134336; G02F 1/133553
See application file for complete search history.

(56) References Cited

U.S. PATENT DOCUMENTS 6,833,883 B2    12/2004  Park et al.
6,839,108 B1 *  1/2005  Hirakata ........... G02F 1/133553
                                                    349/114
(Continued)

FOREIGN PATENT DOCUMENTS

CN      107561766 A     1/2018
JP      11-337974 A    12/1999
(Continued)

OTHER PUBLICATIONS

International Search Report and Written Opinion of PCT Application No. PCT/JP2019/021724, dated Jul. 16, 2019, 11 pages of ISRWO.

*Primary Examiner* — Hoan C Nguyen
(74) *Attorney, Agent, or Firm* — Chip Law Group

(57) ABSTRACT

An electrode structure includes a light reflection film, an insulating film formed on the light reflection film, and a transparent conductive film formed on the insulating film. The transparent conductive film is divided into pieces in a two-dimensional matrix at a predetermined pitch to form transparent pixel electrodes. Each of the transparent pixel electrodes is connected to a corresponding one of drive electrodes formed in a lower layer underlying the light (Continued)

reflection film, through a corresponding one of vias penetrating the insulating film and the light reflection film and insulated from the light reflection film.

19 Claims, 36 Drawing Sheets

(56) References Cited

U.S. PATENT DOCUMENTS

| | | | | |
|---|---|---|---|---|
| 2002/0012088 | A1* | 1/2002 | Ozawa | G02F 1/1337 349/123 |
| 2004/0239846 | A1* | 12/2004 | Wen | G02F 1/13624 349/114 |
| 2005/0264729 | A1* | 12/2005 | Lin | G02F 1/133555 349/114 |
| 2006/0050208 | A1* | 3/2006 | Enomoto | G02F 1/133555 349/114 |
| 2008/0002071 | A1* | 1/2008 | Park | G02F 1/133555 349/33 |
| 2008/0055526 | A1* | 3/2008 | Ino | G02F 1/133555 349/114 |
| 2018/0004037 | A1 | 1/2018 | Park et al. | |

FOREIGN PATENT DOCUMENTS

| | | | | |
|---|---|---|---|---|
| JP | 2002-323704 | A | | 11/2002 |
| JP | 2002323704 | A * | | 11/2002 |
| JP | 2010-039330 | A | | 2/2010 |
| JP | 2010-134317 | A | | 6/2010 |
| KR | 20010098656 | A * | 11/2001 | G02F 1/134336 |
| KR | 10-2002-0066757 | A | | 8/2002 |
| KR | 100487783 | B1 * | | 5/2005 |
| KR | 10-2018-0003687 | A | | 1/2018 |

* cited by examiner

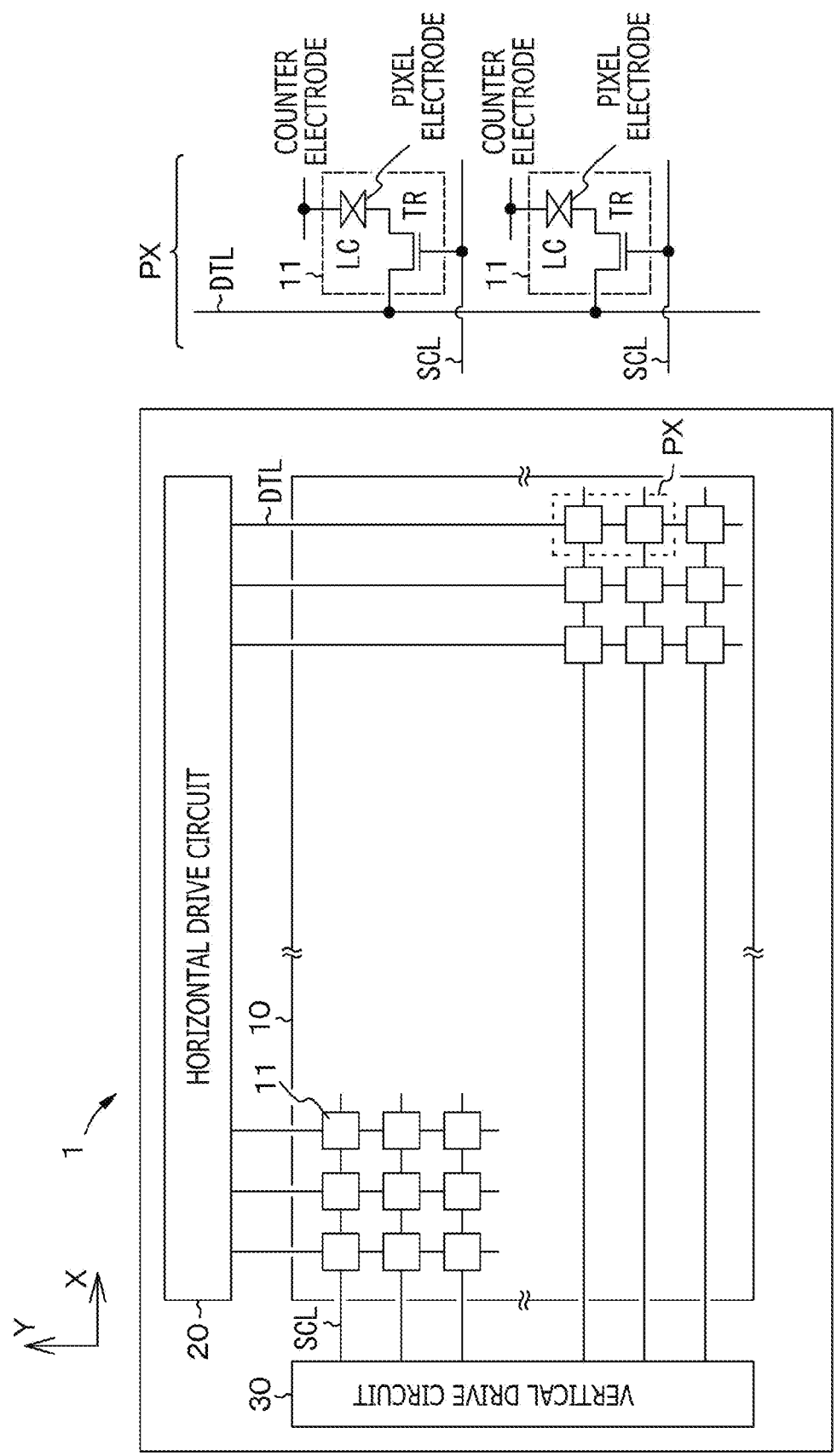

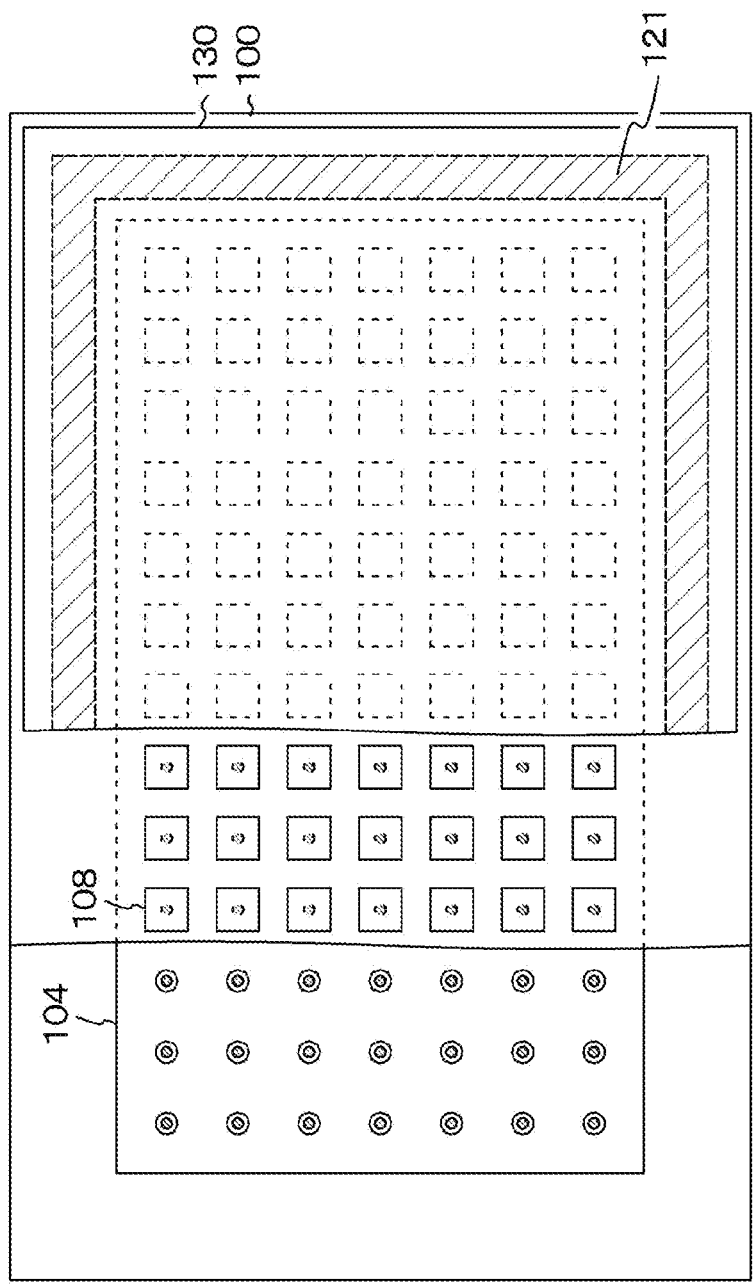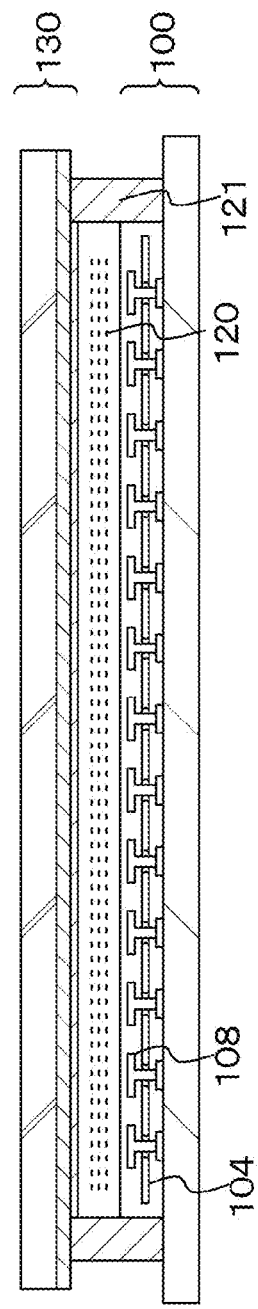
FIG. 2A
FIG. 2B

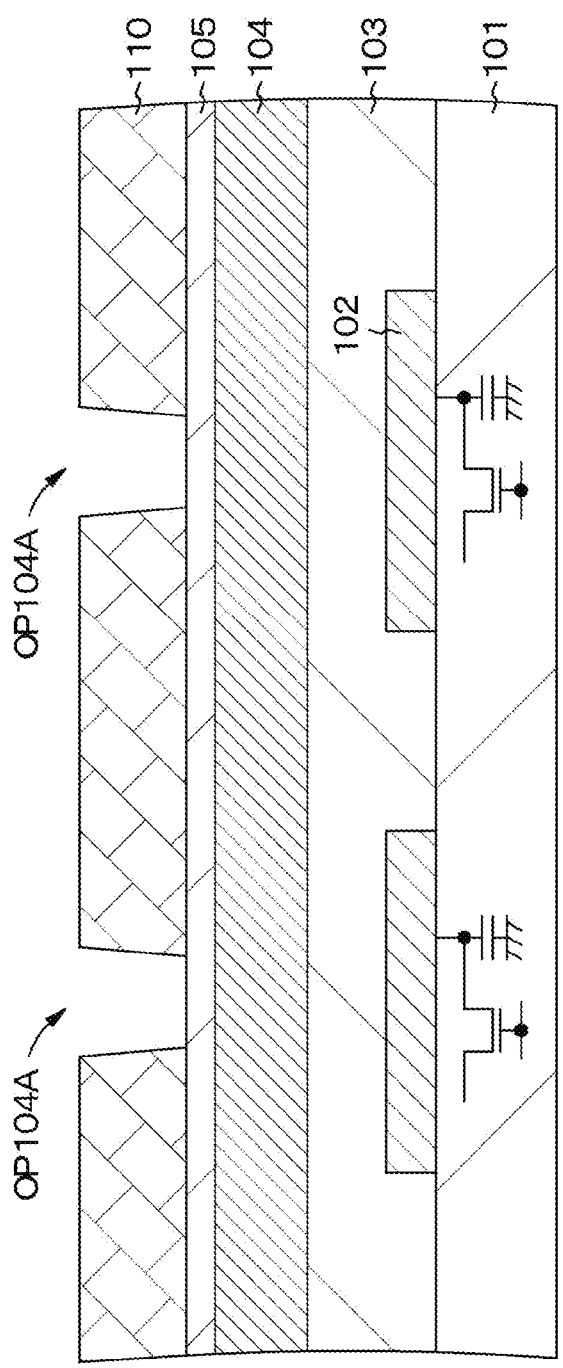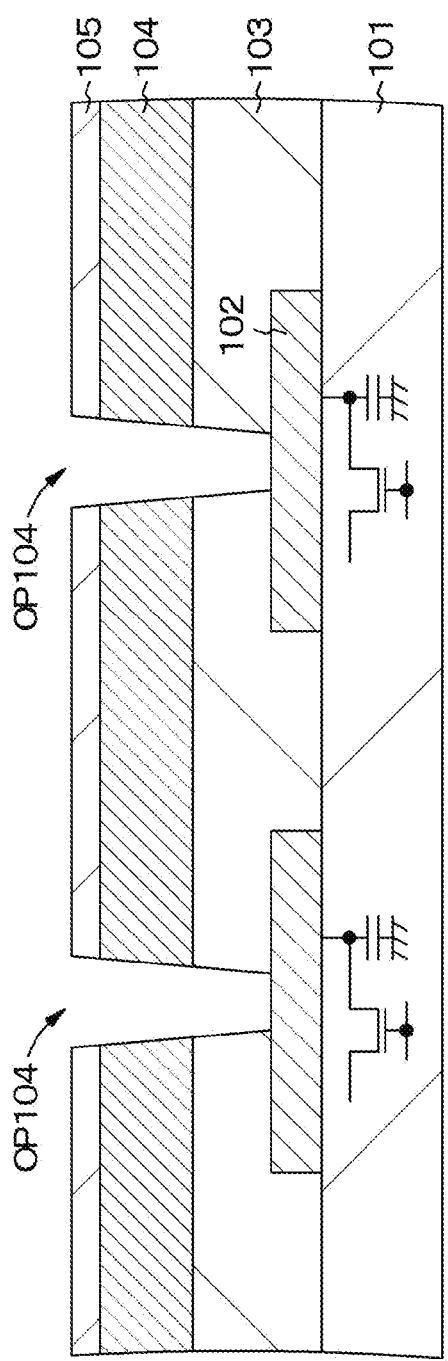
FIG. 8A
FIG. 8B

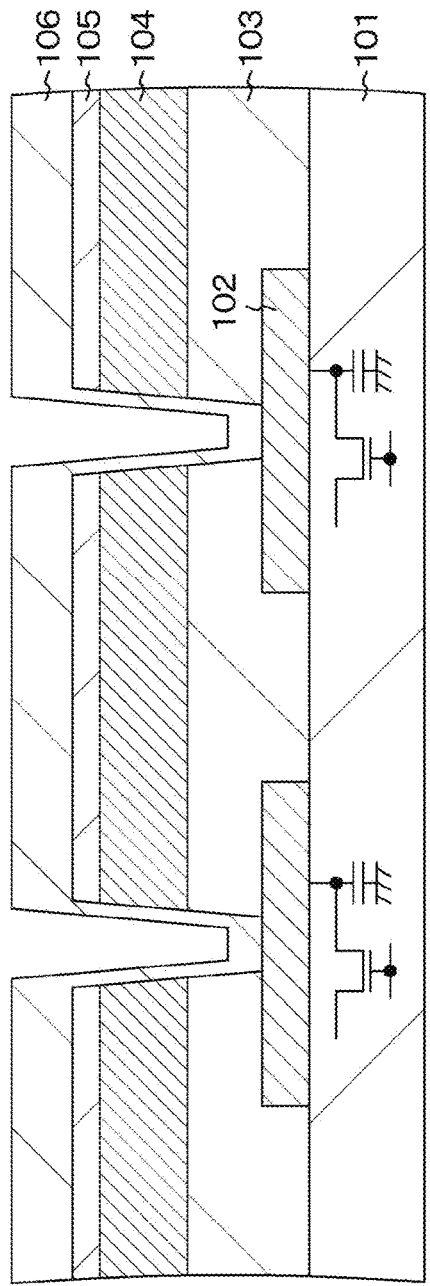
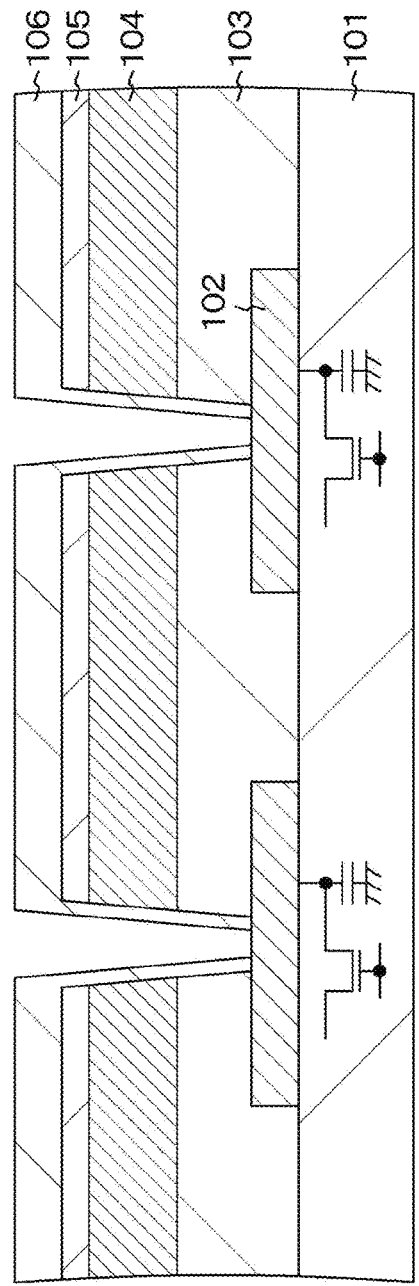
FIG. 9A
FIG. 9B

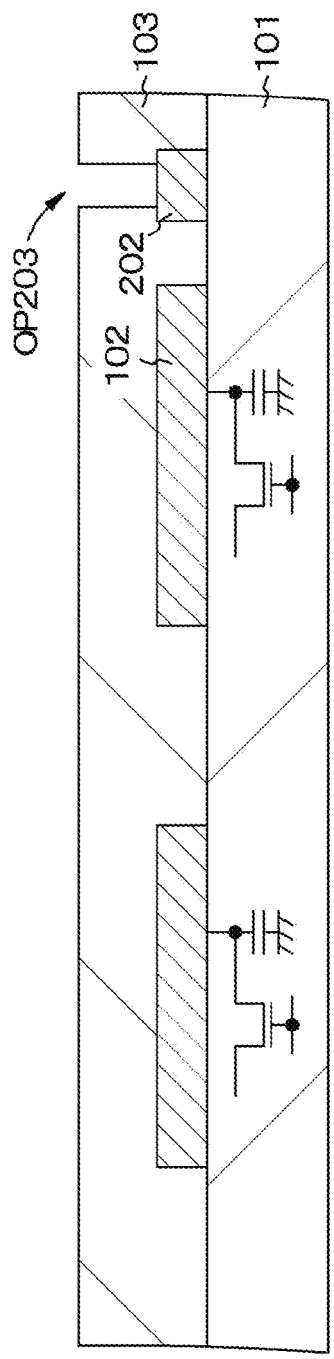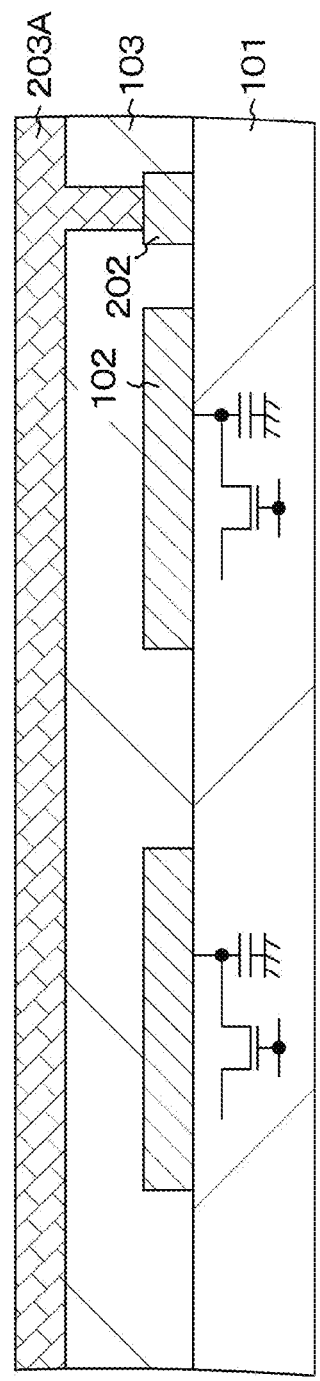

ELECTRODE STRUCTURE, METHOD FOR MANUFACTURING ELECTRODE STRUCTURE, LIQUID CRYSTAL DISPLAY ELEMENT, METHOD FOR DRIVING LIQUID CRYSTAL DISPLAY ELEMENT, AND ELECTRONIC EQUIPMENT

CROSS REFERENCE TO RELATED APPLICATIONS

This application is a U.S. National Phase of International Patent Application No. PCT/JP2019/021724 filed on May 31, 2019, which claims priority benefit of Japanese Patent Application No. JP 2018-127247 filed in the Japan Patent Office on Jul. 4, 2018. Each of the above-referenced applications is hereby incorporated herein by reference in its entirety.

TECHNICAL FIELD

The present disclosure relates to an electrode structure, a method for manufacturing the electrode structure, a liquid crystal display element, a method for driving the liquid crystal display element, and electronic equipment. More specifically, the present disclosure relates to an electrode structure used in a reflective liquid crystal display element and a method for manufacturing the electrode structure, the liquid crystal display element including such an electrode structure and a method for driving the liquid crystal display element, and electronic equipment.

BACKGROUND ART

In a liquid crystal display element including pixels two-dimensionally arranged in a matrix and each including a liquid crystal cell, the pixels are operated as optical shutters (light valves) to display images. As display apparatuses using liquid crystal display elements, direct-viewing display apparatuses and projective (projector-type) display apparatuses have been put to practical use. For not only direct-viewing display apparatuses but also projective display apparatuses, applications have recently been expanding to use in a large-scale conference room and use for entertainment. Thus, there has been a demand for higher definition and higher image quality, and what is called active matrix type liquid crystal display elements have been widely used.

Reflective liquid crystal display elements such as an LCOS (Liquid Crystal On Silicon) and an HTPS (High Temperature Poly-Silicon) control reflection of light incident on the liquid crystal display elements to display images. The reflective liquid crystal display element includes light reflective pixel electrodes such as pixel electrodes including a material reflecting light and pixel electrodes with laminated light reflection films. A liquid crystal material layer is disposed between each of the pixel electrodes and a transparent counter electrode, and a voltage is applied between the pixel electrode and the counter electrode to change an orientation direction of liquid crystals to control an aperture ratio for each pixel. The pixel electrode is driven for each pixel, and thus the pixel electrodes need to be electrically insulated from each other. Thus, a gap with a predetermined size or larger needs to be provided between the pixel electrodes according to an arrangement pitch of each of the pixel electrodes. Proposals have been made that, for example, an overhang be provided on a wiring layer below the pixel electrode to occlude the gap portion because the gap portion does not contribute to light reflection (see, for example, PTL 1).

CITATION LIST

Patent Literature

[PTL 1]
Japanese Patent Laid-Open No. 2010-134317

SUMMARY

Technical Problem

The ratio of the gap portion between the pixel electrodes increases with decreasing pixel pitch. Accordingly, qualitatively, the aperture ratio (reflectance) decreases consistently with pixel pitch. For example, in the configuration in which the overhang is provided on the wiring layer below the pixel electrode to occlude the gap portion, a decrease in aperture ratio can be mitigated. However, light is reflected by each of the pixel electrodes and the wiring layer disposed at a position different from the position of the pixel electrode, and optical characteristics may be affected by the difference in position between the pixel electrode and the wiring layer.

Thus, an object of the present disclosure is to provide an electrode structure used in a liquid crystal display element and preventing the aperture ratio from decreasing even with a reduced pixel pitch, the electrode structure having favorable optical characteristics, and a method for manufacturing the electrode structure, a liquid crystal display element including such an electrode structure and a method for driving the liquid crystal display element, and electronic element.

Solution to Problem

An electrode structure according to the present disclosure for achieving the above-described object includes a light reflection film, an insulating film formed on the light reflection film, and a transparent conductive film formed on the insulating film. The transparent conductive film is divided into pieces in a two-dimensional matrix at a predetermined pitch to form transparent pixel electrodes. Each of the transparent pixel electrodes is connected to a corresponding one of drive electrodes formed in a lower layer underlying the light reflection film, through a corresponding one of vias penetrating the insulating film and the light reflection film and insulated from the light reflection film.

A method for manufacturing an electrode structure according to the present disclosure for achieving the above-described object, the electrode structure including a light reflection film, an insulating film formed on the light reflection film, and a transparent conductive film formed on the insulating film, includes a step of forming the light reflection film, the insulating film formed on the light reflection film, and the transparent conductive film formed on the insulating film, a step of dividing the transparent conductive film into pieces in a two-dimensional matrix at a predetermined pitch to form transparent pixel electrodes, and a step of forming vias penetrating the insulating film and the light reflection film and insulated from the light reflection film, each of the vias being used to connect a corresponding one of the transparent pixel electrodes to a corresponding one of wires formed in a lower layer underlying the light reflection film.

A liquid crystal display element according to the present disclosure for achieving the above-described object includes a front panel, a back panel disposed opposite to the front panel, and a liquid crystal material layer sandwiched between the front panel and the back panel. On a substrate forming the back panel, an electrode structure is configured that includes a light reflection film, an insulating film formed on the light reflection film, and a transparent conductive film formed on the insulating film. The transparent conductive film is divided into pieces in a two-dimensional matrix at a predetermined pitch to form transparent pixel electrodes. Each of the transparent pixel electrodes is connected to a corresponding one of wires formed in a lower layer underlying the light reflection film, through a corresponding one of vias penetrating the insulating film and the light reflection film and insulated from the light reflection film.

A method for driving a liquid crystal display element according to the present disclosure for achieving the above-described object is provided, the liquid crystal display element including a front panel, a back panel disposed opposite to the front panel, and a liquid crystal material layer sandwiched between the front panel and the back panel. On a substrate forming the back panel, an electrode structure is configured that includes a light reflection film, an insulating film formed on the light reflection film, and a transparent conductive film formed on the insulating film. The transparent conductive film is divided into pieces in a two-dimensional matrix at a predetermined pitch to form transparent pixel electrodes. Each of the transparent pixel electrodes is connected to a corresponding one of wires formed in a lower layer underlying the light reflection film, through a corresponding one of vias penetrating the insulating film and the light reflection film and insulated from the light reflection film. The light reflection film is connected to an electrode for voltage supply formed in a lower layer underlying the light reflection film. When the liquid crystal display element is driven, the light reflection film is in any one of an electrically floating state, a state in which a voltage of an electrically positive polarity is applied to the light reflection film, or a state in which a voltage of an electrically negative polarity is applied to the light reflection film.

Electronic equipment according to the present disclosure for achieving the above-described object includes a liquid crystal display element including a front panel, a back panel disposed opposite to the front panel, and a liquid crystal material layer sandwiched between the front panel and the back panel. On a substrate forming the back panel, an electrode structure is configured that includes a light reflection film, an insulating film formed on the light reflection film, and a transparent conductive film formed on the insulating film. The transparent conductive film is divided into pieces in a two-dimensional matrix at a predetermined pitch to form transparent pixel electrodes. Each of the transparent pixel electrodes is connected to a corresponding one of wires formed in a lower layer underlying the light reflection film, through a corresponding one of vias penetrating the insulating film and the light reflection film and insulated from the light reflection film.

BRIEF DESCRIPTION OF DRAWINGS

FIG. 1 is a schematic diagram for describing a liquid crystal display element according to a first embodiment of the present disclosure.

FIGS. 2A and 2B are schematic diagrams for describing an internal configuration of the liquid crystal display element; FIG. 2A is a plan view, and FIG. 2B is a cross-sectional view.

FIGS. 8A and 8B are schematic partial end views for describing the method for manufacturing a liquid crystal display element according to the first embodiment and are continued from FIG. 7B.

FIGS. 9A and 9B are schematic partial end views for describing the method for manufacturing a liquid crystal display element according to the first embodiment and are continued from FIG. 8B.

FIGS. 25A and 25B are schematic partial end views for describing the method for manufacturing a liquid crystal display element according to the second embodiment and are continued from FIG. 24B.

FIG. 34A is a front view of the digital still camera, and FIG. 34B is a rear view of the digital still camera.

DESCRIPTION OF EMBODIMENTS

Figure 3:
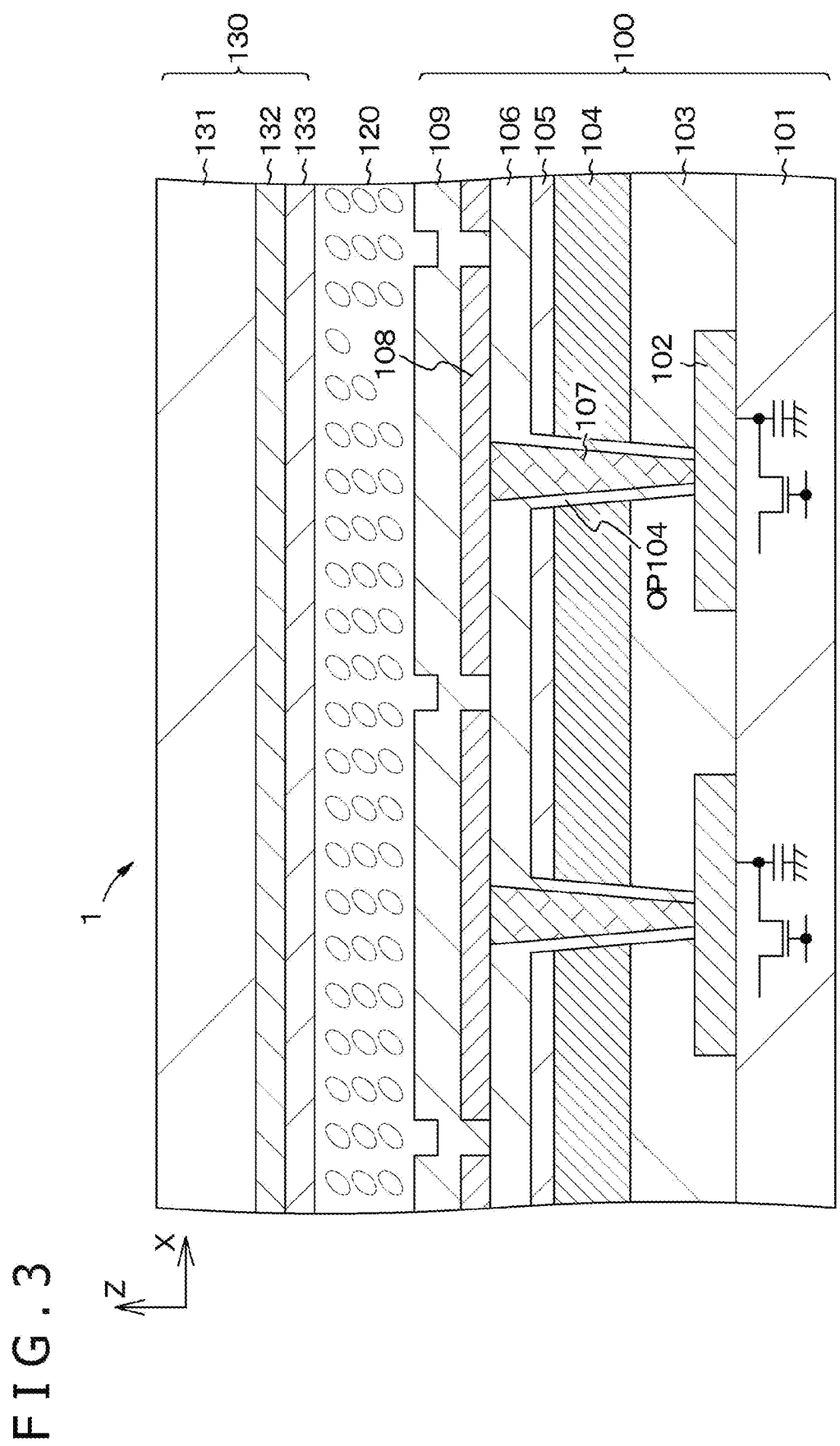
FIG. 3 is a schematic partial cross-sectional view for describing a structure of the liquid crystal display element.

With reference to the drawings, the present disclosure will be described below on the basis of embodiments. The present disclosure is not limited to the embodiments, and various numerical values and materials in the embodiments are illustrative. In the description below, identical elements or elements with identical functions are denoted by identical reference signs, and duplicate descriptions are omitted. Note that the description is in the following order.

1. Description of Electrode Structure, Method for Manufacturing Electrode Structure, Liquid Crystal Display Element, Method for Driving Liquid Crystal Display Element, and Electronic Equipment According to Present Disclosure in General
2. First Embodiment
3. Second Embodiment
4. Third Embodiment
5. Description of Electronic equipment, and Miscellaneous Description of Electrode Structure, Method for Manufacturing Electrode Structure, Liquid Crystal Display Element, Method for Driving Liquid Crystal Display Element, and Electronic Equipment According to Present Disclosure in General An electrode structure according to the present disclosure, an electrode structure obtained by a method for manufacturing an electrode structure according to the present disclosure, an electrode structure used in a liquid crystal display element according to the present disclosure, and an electrode structure used in a liquid crystal display element in which a method for driving the liquid crystal display element according to the present disclosure is executed (these electrode structures may hereinafter simply be referred to as the electrode structure according to the present disclosure) can be configured such that a light reflection film is formed as a continuous common layer. Alternatively, the electrode structure can be configured such that the light reflection film is divided into strip-like pieces corresponding to a group of transparent pixel electrodes arranged in a row direction.

The electrode structure according to the present disclosure including the above-described preferred configuration can be configured such that the light reflection film is formed to be electrically floating.

Alternatively, the electrode structure can be configured such that the light reflection film is connected to an electrode for voltage supply formed in a lower layer underlying the light reflection film. In this case, the electrode structure can be configured such that the electrode structure is formed on a substrate forming a back panel of a reflective liquid crystal display element and that the electrode for voltage supply is supplied with a voltage via a switching transistor provided on the substrate.

The electrode structure according to the present disclosure including the above-described preferred configuration can be configured such that the light reflection film is formed as a continuous common layer and supplied with a voltage from the electrode for voltage supply. Alternatively, the electrode structure can be formed such that the light reflection film is divided into strip-like pieces corresponding to a group of the transparent pixel electrodes arranged in the row direction and that the strip-like pieces are connected to separately provided respective electrodes for voltage supply and supplied with respective separate voltages.

The electrode structure according to the present disclosure including the above-described various preferred configurations can be configured such that a dielectric film is formed on an entire surface including surfaces of the transparent pixel electrodes. In this case, the electrode structure can be configured such that the electrode structure is subjected to planarization treatment to reduce level differences in the dielectric film.

Examples of the planarization treatment include, for example, treatment in which a surface of the dielectric film is polished, treatment in which level difference portions of the dielectric film are filled, or treatment in which the transparent pixel electrodes, corresponding to a base for the dielectric film, are each tapered at ends.

The electrode structure according to the present disclosure including the above-described various preferred configurations can be configured such that a transparent pixel electrode-side portion of each of vias includes a light reflective conductive material.

A method for manufacturing an electrode structure according to the present disclosure for manufacturing the electrode structure including the above-described various preferred configurations includes, as described above:

forming a light reflection film, an insulating film formed on the light reflection film, and a transparent conductive film formed on the insulating film, dividing the transparent conductive film into pieces in a two-dimensional matrix at a predetermined pitch to form transparent pixel electrodes, and forming vias penetrating the insulating film and the light reflection film and insulated from the light reflection film, each of the vias being used to connect a corresponding one of the transparent pixel electrodes to a corresponding one of wires formed in a lower layer underlying the light reflection film. In this case, the method can be such that the steps executed after formation of the light reflection film are performed with a predetermined voltage supplied to the light reflection film.

In a method for driving a liquid crystal display element including the electrode structure including the above-described various preferred configurations, the light reflection film is in any one of an electrically floating state, a state in which a voltage of an electrically positive polarity is applied to the light reflection film, or a state in which a voltage of an electrically negative polarity is applied to the light reflection film. In this case, the method can be such that the electrode for voltage supply is supplied with a voltage via a switching transistor provided on the substrate.

The method for driving the liquid crystal display element according to the present disclosure including the above-described various preferred configurations can be such that the light reflection film is formed as a continuous common layer, is formed as a continuous common layer, and is supplied with a voltage from the electrode for voltage supply. Alternatively, the method can be such that the light reflection film is divided into strip-like pieces corresponding to a group of the transparent pixel electrodes arranged in a row direction and that the strip-like pieces are connected to separately provided respective electrodes for voltage supply and supplied with respective separate voltages.

As a front panel, a substrate including a transparent material such as glass can be used. A counter electrode provided in the front panel can be formed using a transparent conductive material such as an indium tin oxide (ITO) or an indium zinc oxide. The counter electrode functions as a common electrode common to the pixels in the liquid crystal display element.

As the back panel, a substrate including a transparent material such as glass or a substrate including a semiconductor material such as silicon can be used. In a case where a glass substrate or the like is used as the back panel, a drive circuit driving the pixels can be configured by forming and processing a semiconductor material layer and the like on the glass substrate. In a case where a substrate including a semiconductor material such as silicon is used, the drive circuit can be configured by, for example, forming a transistor or the like in a well provided in the substrate.

The transparent pixel electrodes into which the transparent conductive film is divided can be formed using a transparent conductive material such as an ITO or IZO, similarly to the counter electrode. Note that, in some cases, a metal film thinned enough to have light transmittivity can be used.

The light reflection film can be formed using a metal material such as aluminum (Al), an aluminum alloy such as Al—Cu or Al—Si, or silver (Ag).

The liquid crystal display element may be configured to display monochromatic images or to display color images. As values for the pixels in the liquid crystal display element, several image resolutions such as U-XGA (1600, 1200), HD-TV (1920, 1080), and Q-XGA (2048, 1536) as well as (3840, 2160) and (7680, 4320) can be illustrated, but the present disclosure is not limited to these values.

Additionally, as electronic equipment including the liquid crystal display element of the present disclosure, a direct-viewing display apparatus and a projective display apparatus as well as various types of electronic equipment including an image display function can be illustrated.

Various conditions used herein are satisfied in a case where the conditions are met in a rigorous manner as well as in a case where the conditions are substantially met. The presence of various variations attributed to design or manufacture is accepted. Additionally, the drawings used in the description below are schematic and do not indicate actual dimensions or the ratio of the dimensions.

First Embodiment

A first embodiment relates to an electrode structure, a method for manufacturing the electrode structure, a liquid crystal display element, and electronic equipment according to the present disclosure.

FIG. 1 is a schematic diagram for describing the liquid crystal display element according to the first embodiment of the present disclosure.

The liquid crystal display element according to the first embodiment is an active-matrix liquid crystal display element. As illustrated in FIG. 1, a liquid crystal display element 1 includes a pixel array section 10 including pixels 11 arranged in a matrix and each including a liquid crystal cell, and various circuits such as a horizontal drive circuit 20 and a vertical drive circuit 30 for driving the pixel array section 10. Note that, in the example illustrated in FIG. 1, the horizontal drive circuit 20 and the vertical drive circuit 30 are each disposed on one end side of the pixel array section 10, but this is only illustrative.

The pixel array section 10 includes, for example, a pair of opposite substrates and a liquid crystal material layer disposed between the substrates, various wires such as scan lines SCL and data lines DTL used to drive the pixels 11, transparent pixel electrodes provided at portions corresponding to the pixels, counter electrodes opposite to the transparent pixel electrodes, pixel transistors connecting the data lines DTL to the transparent pixel electrodes, and the like. A connection relation of two pixels 11 arranged in the vertical direction (in FIG. 1, a Y direction) is schematically illustrated in the right side of FIG. 1. A total of M×N pixels 11 is disposed in a matrix; M pixels 11 are disposed in the horizontal direction, and N pixels 11 are disposed in the vertical direction.

FIGS. 2A and 2B are schematic diagrams for describing an internal configuration of the liquid crystal display element. FIG. 2A is a plan view, and FIG. 2B is a cross-sectional view. In FIG. 2A, parts of the components are cut away in order to clarify a lamination relation. FIG. 3 is a schematic partial cross-sectional view for describing a structure of the liquid crystal display element. Note that, for convenience of illustration, shapes of the components and the like are exaggerated.

As illustrated in FIGS. 2A and 2B, the liquid crystal display element 1 includes a front panel 130, a back panel 100 disposed opposite to the front panel 130, and a liquid crystal material layer 120 sandwiched between the front panel 130 and the back panel 100. The front panel 130 and the back panel 100 are sealed by a seal portion 121. The seal portion 121 is annular and surrounds the liquid crystal material layer 120.

As described below, the back panel 100 includes a substrate including a semiconductor material, for example, silicon. The liquid crystal display element 1 is a reflective liquid crystal display element.

As illustrated in FIG. 3, the front panel 130 is provided with a counter electrode including a transparent conductive material, for example, an ITO. More specifically, the front panel 130 includes, for example, a rectangular substrate 131 including transparent glass, a counter electrode 132 provided on a liquid crystal material layer 120-side surface of the substrate 131, a dielectric film 133 provided on the counter electrode 132, and the like. A liquid crystal cell forming the pixel 11 includes a transparent conductive film 108, portions of the liquid crystal material layer 120 sandwiched between the transparent conductive film 108 and the counter electrode 132, the counter electrode 132 opposite to the transparent conductive film 108, and the like. When the liquid crystal display element 1 is driven, a voltage of positive polarity or a voltage of negative polarity is alternately applied to the counter electrode 132.

The back panel 100 includes an electrode structure including a light reflection film (light reflector) 104 formed on a rectangular substrate 101 including a semiconductor material, for example, silicon, insulating films 105 and 106 formed on the light reflection film 104, and the transparent conductive film 108 formed on the insulating film 106. A dielectric film 109 is formed on an entire surface including surfaces of pieces of the transparent conductive film 108.

As illustrated in FIGS. 2A, 2B, and 3, the transparent conductive film 108 is divided into pieces in a two-dimensional matrix at a predetermined pitch to form transparent pixel electrodes. In the description below, the transparent pixel electrodes are also represented using reference sign 108. Additionally, as illustrated in FIGS. 2A and 2B, the light reflection film 104 is formed as a continuous common layer in an electrically floating state.

As illustrated in FIG. 3, each of the transparent pixel electrodes 108 is connected to a corresponding one of drive electrodes 102 formed in a lower layer underlying the light reflection film 104, through a corresponding one of vias 107 penetrating the insulating films 105 and 106 and the light reflection film 104 and insulated from the light reflection film 104.

Transistors and various wires not illustrated are formed on the substrate 101 and form a drive circuit for driving the transparent pixel electrodes 108 through the drive electrodes 102 and the vias 107. Reference sign 103 denotes a planarization film covering the drive electrodes 102, and reference sign OP104 denotes an opening in which the via 107 is formed.

Figure 4:
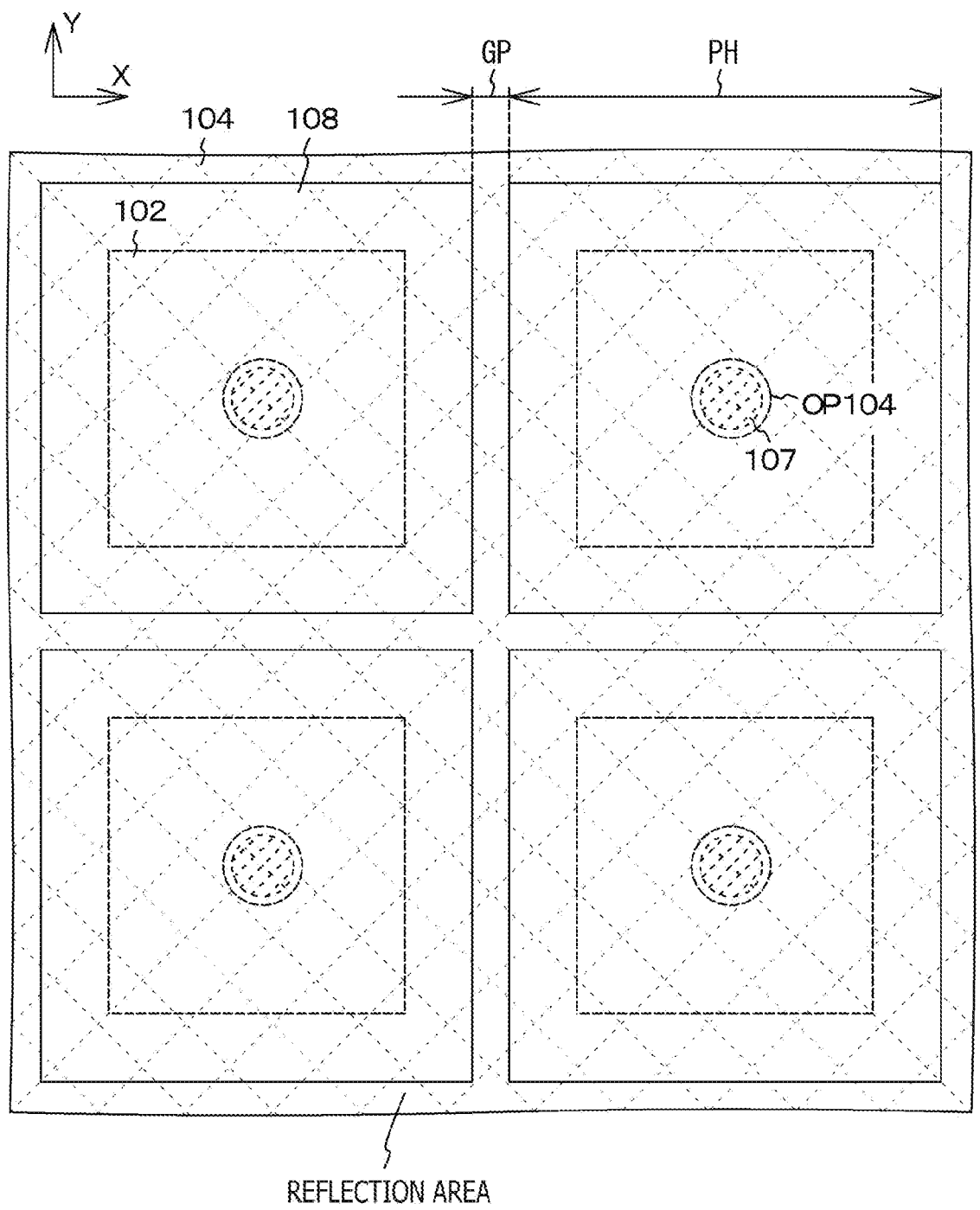
FIG. 4 is a diagram for describing a reflection area of the liquid crystal display element according to the first embodiment and is a schematic plan view illustrating an arrangement relation between transparent pixel electrodes and a light reflection film.

FIG. 4 is a diagram for describing a reflection area in the liquid crystal display element according to the first embodiment and is a schematic plan view illustrating an arrangement relation between the pixel electrodes and the light reflection film.

In a high-definition liquid crystal display element, an arrangement pitch (in FIG. 4, denoted by reference sign PH) of each of the transparent pixel electrodes 108 has a value of, for example, 4 micrometers, and a gap between the transparent pixel electrodes 108 (denoted by reference sign GP) has a value of, for example, 0.2 micrometers. Additionally, the diameter of the opening OP104 has a value of, for example, 0.3 micrometers.

In a case where a voltage is applied to the transparent pixel electrode 108 to control an orientation direction of liquid crystal, a change in an orientation of the liquid crystal material layer 120 covers not only portions of the liquid crystal material layer 120 opposing the transparent pixel electrode 108 but also surroundings of these portions. Accordingly, an area of the gap GP also contributes to display of images. External light passing through the transparent pixel electrodes 108 and the surrounding gap GP is reflected by the light reflection film 104 located in a lower layer underlying the transparent pixel electrodes 108. Even though the opening OP104 portions do not contribute to reflection, an aperture ratio (reflectance) has a value of approximately 98 percent by estimate. Furthermore, any rays of external light passing through the transparent pixel electrodes 108 and the surrounding gap GP are reflected by a reflection layer disposed at a common position. This prevents an adverse effect, on optical characteristics, of a difference in position where reflection occurs.

Now, for assistance in understanding of the present disclosure, for example, the aperture ratio of a liquid crystal display element in a reference example in which pixel electrodes include a light reflective material will be described.

Figure 5:
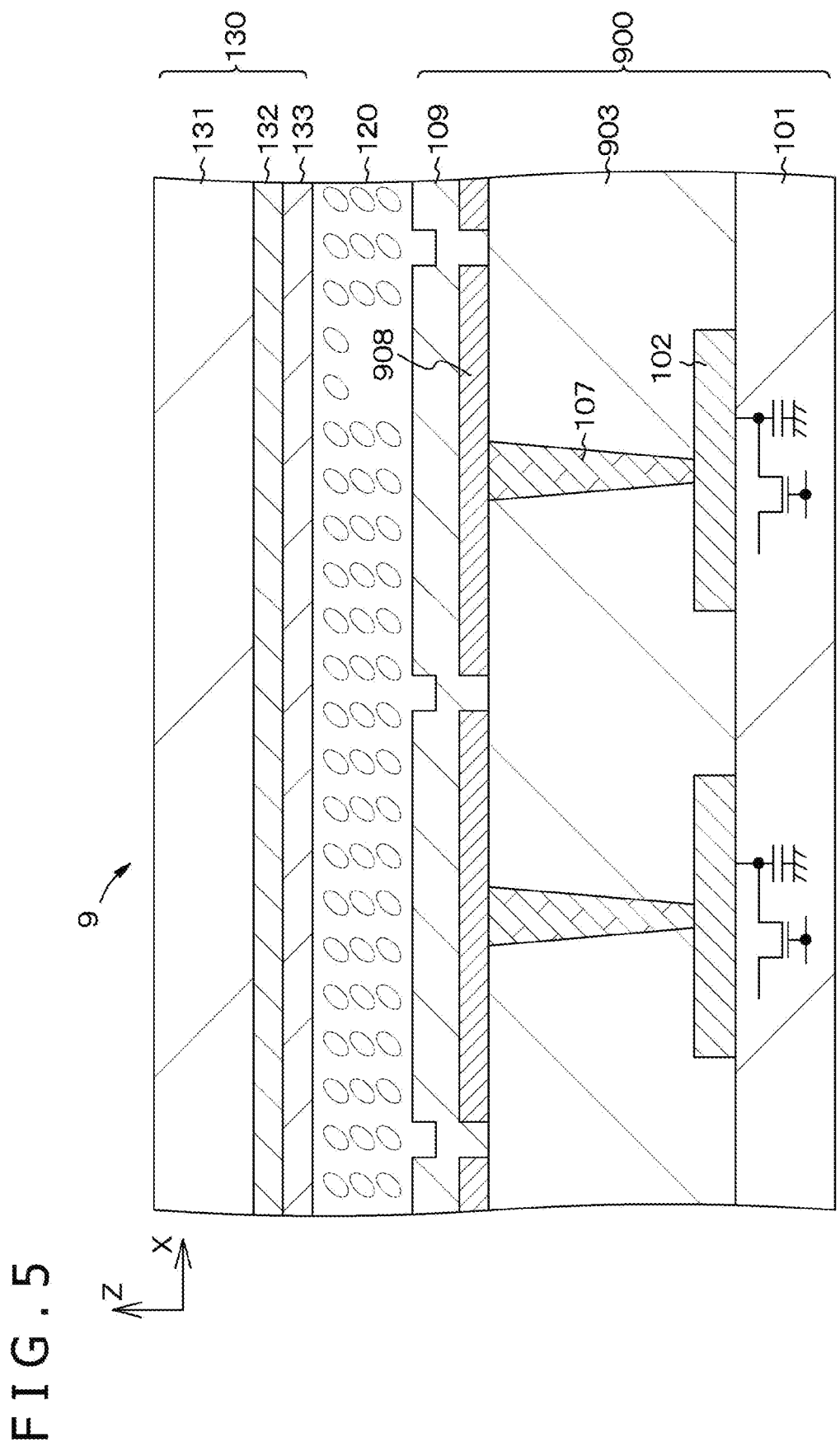
FIG. 5 is a schematic diagram for describing an internal configuration of a liquid crystal display element according to a reference example.
Figure 6:
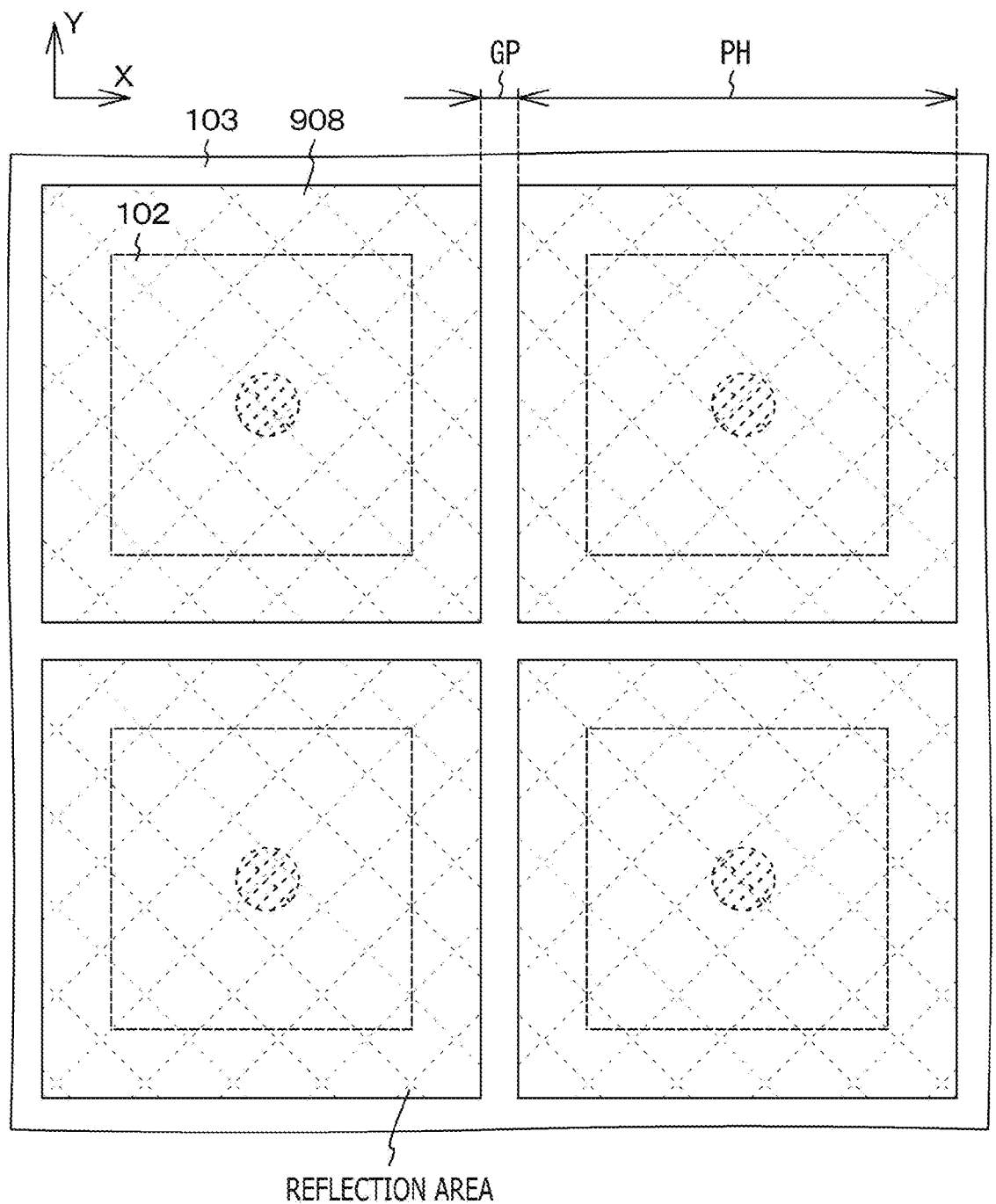
FIG. 6 is a diagram for describing a reflection area of the liquid crystal display element according to the reference example and is a schematic plan view illustrating an arrangement relation between light-reflective pixel electrodes.

FIG. 5 is a schematic diagram for describing an internal configuration of the liquid crystal display element according to the reference example. FIG. 6 is a diagram for describing a reflection area in the liquid crystal display element according to the reference example, and is a schematic plan view illustrating an arrangement relation of light-reflective pixel electrodes.

A liquid crystal display element 9 in the reference example illustrated in FIG. 5 corresponds to the liquid crystal display element 1 of the present disclosure in which the transparent pixel electrodes 108 are replaced with light-reflective pixel electrodes 908 and in which the planarization film 103, the light reflection film 104, and the insulating films 105 and 106 are all replaced with planarization films 903. The arrangement pitch PH of each of the pixel electrodes 908 and the gap GP between the pixel electrodes 908 illustrated in FIG. 6 are similar to the above-described numerical values. In this configuration, external light passing through the gap GP does not contribute to display. The aperture ratio (reflectance) has a value of approximately not more than 90 percent by estimate.

Now, a method for manufacturing a liquid crystal display element, the method including a method for manufacturing an electrode structure, will be described.

As described above, on the substrate 101 forming the back panel 100 in the liquid crystal display element 1, the electrode structure is configured that includes the light reflection film 104, the insulating films 105 and 106 formed on the light reflection film 104, and the transparent conductive film formed on the insulating film 106. A method for manufacturing the electrode structure includes a step of forming the light reflection film 104, the insulating films 105 and 106 formed on the light reflection film 104, and the transparent conductive film formed on the insulating film 106, a step of dividing the transparent conductive film into pieces in a two-dimensional matrix at a predetermined pitch to form transparent pixel electrodes 108, and a step of forming vias penetrating the insulating films 105 and 106 and the light reflection film 104 and insulated from the light reflection film 104, each of the vias being used to connect a corresponding one of the transparent pixel electrodes 108 to a corresponding one of wires formed in a lower layer underlying the light reflection film 104.

FIGS. 7A, 7B, 8A, 8B, 9A, 9B, 10A, 10B, 11A, 11B, 12, 13A, 13B, 14, 15A, 15B, and 16 are schematic partial end views for describing a method for manufacturing a liquid crystal display element according to the first embodiment. With reference to these figures, a method for manufacturing the liquid crystal display element 1 will be described in detail.

Figure 7A:
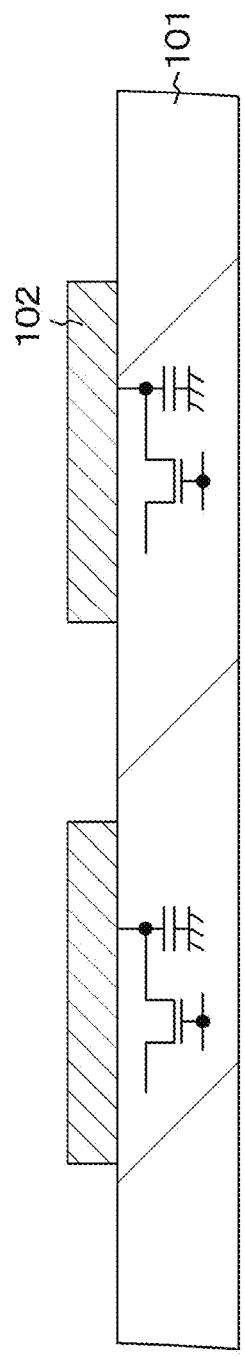
FIGS. 7A and 7B are schematic partial end views for describing a method for manufacturing a liquid crystal display element according to the first embodiment.

[Step-100] (See FIGS. 7A and 7B) The substrate 101 in which drive circuits are formed is prepared, and drive electrodes 102 are formed on the substrate 101 by a well-known film formation method or patterning method (see FIG. 7A). The drive electrodes 102 include an aluminum alloy, for example, Al—Cu. Note that, for an improved electric contact characteristic, for example, a barrier metal such as TiN may be formed on each of the drive electrodes 102.

Figure 7B:
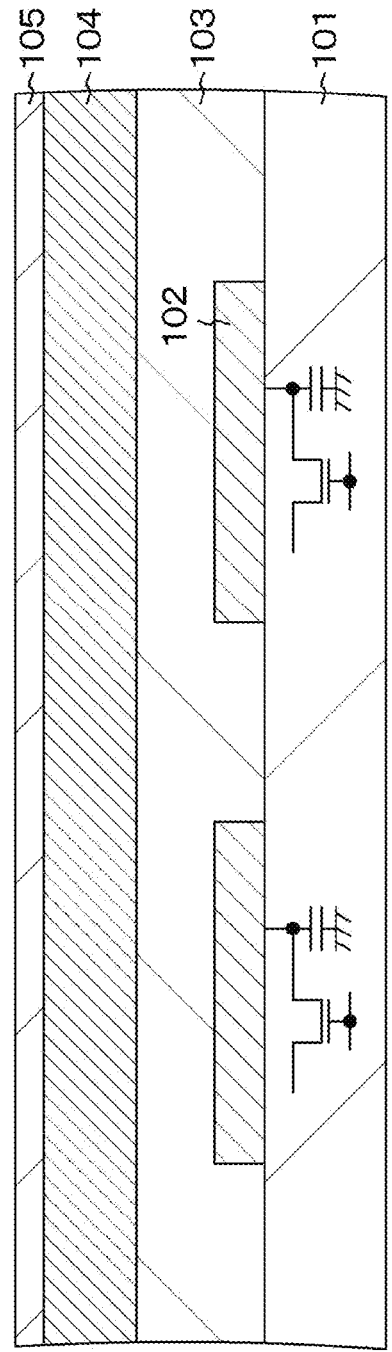

Then, the planarization film 103 including, for example, a silicon oxide is formed on an entire surface including surfaces of the drive electrodes 102, and subsequently the light reflection film 104 including an aluminum alloy, for example, Al—Cu and the insulating film 105 including, for example, a silicon oxide are sequentially formed (see FIG. 7B). The light reflection film 104 has a thickness of, for example, 70 nanometers.

[Step-110] (See FIGS. 8A and 8B)

Then, on the insulating film 105, a mask layer 110 is formed that includes openings corresponding to portions in which the vias 107 are to be disposed. Reference sign OP104A indicates the openings corresponding to the portions in which the vias 107 are to be disposed (see FIG. 8A). Subsequently, dry etching or the like is performed to form the openings OP104 with the drive electrode 102 exposed at a bottom portion of each of the openings OP104, and then the mask layer 110 is removed (see FIG. 8B).

[Step-120] (See FIGS. 9A and 9B)

Then, on the entire surface of the insulating film 105 including surfaces of the openings OP104, the insulating film 106 including, for example, a silicon oxide is formed by an ALD (Atomic Layer Deposition) method or the like. Note that the insulating film 106 is formed to a thickness sufficient to fill only a part of each of the openings OP104 (see FIG. 9A).

Subsequently, the dry etching method or the like is performed on the entire surface of the insulating film 106 under conditions that the insulating film 106 remains on a wall surface of each opening OP104 and that the insulating film 106 at the bottom portion of the opening OP104 is completely removed (see FIG. 9B). Note that this treatment generally thins the insulating film 106. In this state, the sum of the thickness of the insulating film 105 and the thickness of the insulating film 106 has a value of, for example, 45 to 75 nanometers.

Figure 10A:
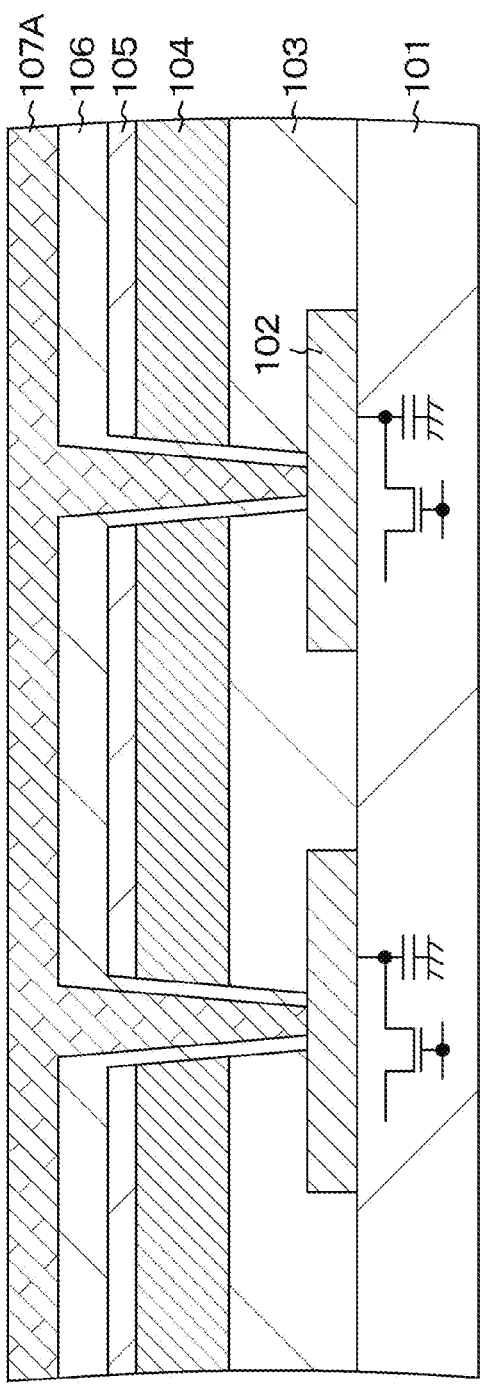
FIGS. 10A and 10B are schematic partial end views for describing the method for manufacturing a liquid crystal display element according to the first embodiment and are continued from FIG. 9B.
Figure 10B:
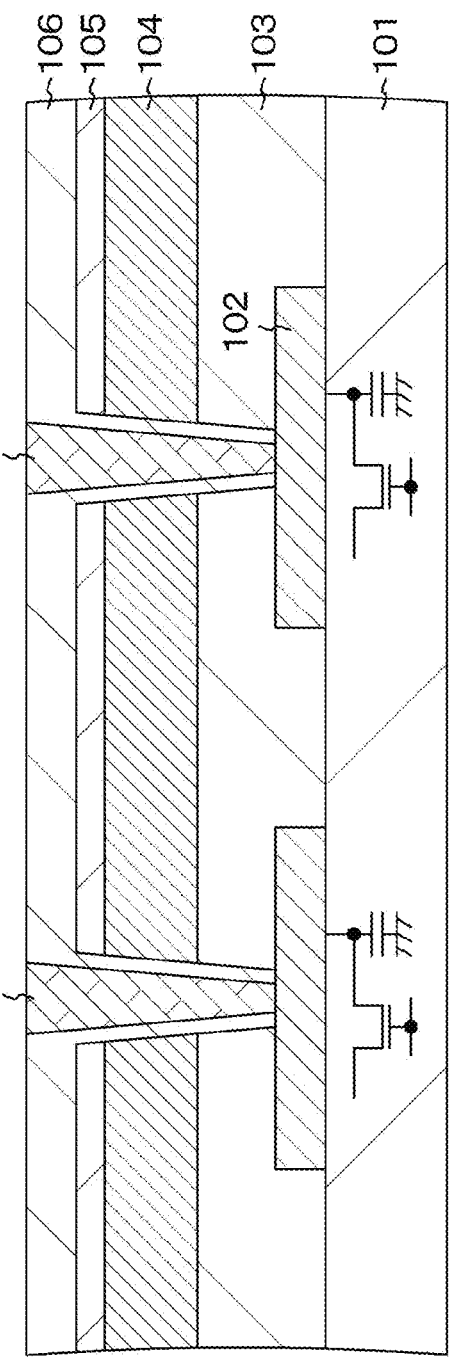

[Step-130] (See FIGS. 10A and 10B)

Then, on the entire surface including the surfaces of the openings OP104, for example, tungsten (W) is used to form a conductive material layer 107A forming the vias 107 (see FIG. 10A). Subsequently, planarization is performed by, for example, CMP to form the vias 107 embedded in the openings (see FIG. 10B).

Figure 11A:
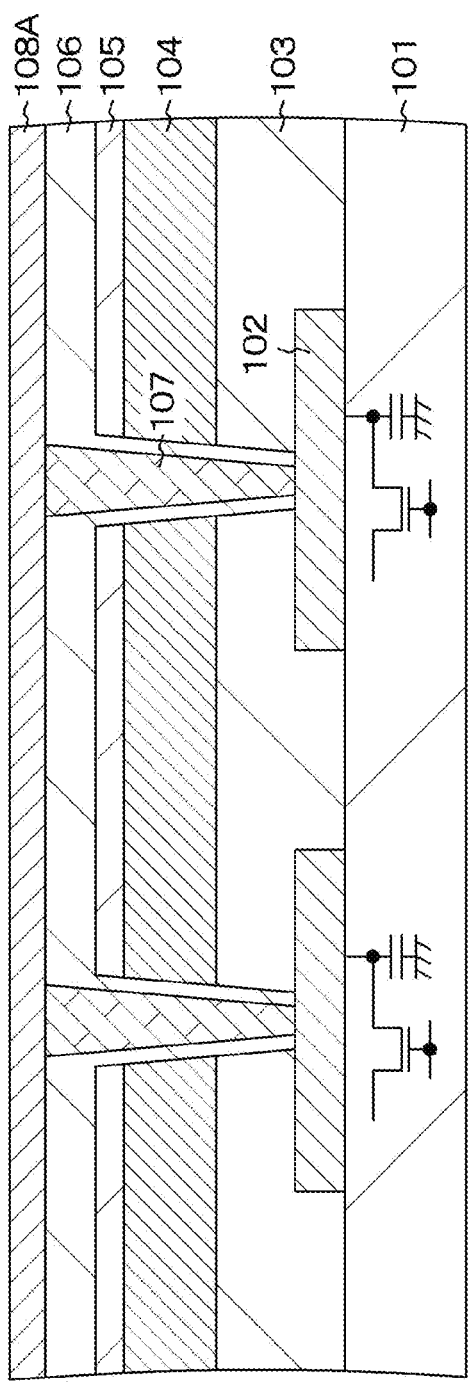
FIGS. 11A and 11B are schematic partial end views for describing the method for manufacturing a liquid crystal display element according to the first embodiment and are continued from FIG. 10B.
Figure 11B:
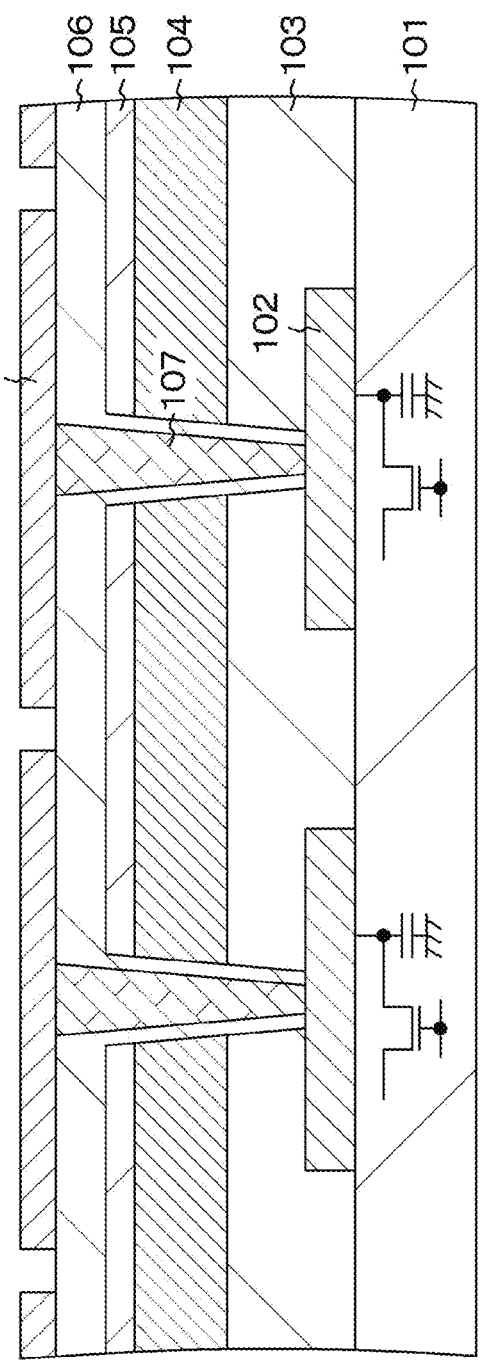

[Step-140] (See FIGS. 11A and 11B)

Then, on the entire surface of the insulating film 106 including surfaces of the vias 107, a transparent conductive film 108A including, for example, an ITO is formed (see FIG. 11A). The transparent conductive film 108A has a thickness of, for example, 10 nanometers. Subsequently, the transparent conductive film 108A is divided into pieces in a two-dimensional matrix at a predetermined pitch by a well-known patterning method to form the transparent pixel electrodes 108 (see FIG. 11B).

Figure 12:
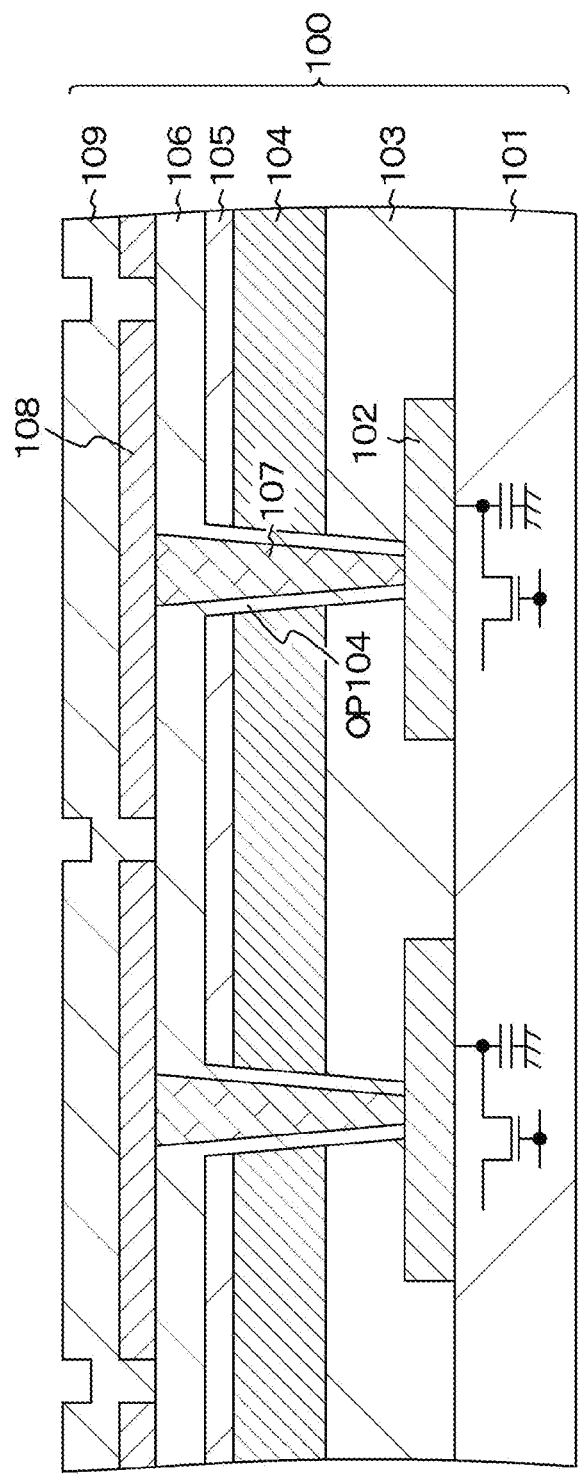
FIG. 12 is a schematic partial end view for describing the method for manufacturing a liquid crystal display element according to the first embodiment and is continued from FIG. 11B.

[Step-150] (See FIG. 12)

Then, the dielectric film 109 including, for example, a silicon nitride is formed on the entire surface including surfaces of the transparent pixel electrodes 108. The thickness of the dielectric film 109 has a value of, for example, 70 nanometers.

The above-described steps allow obtainment of the back panel 100 provided with the electrode structure including the light reflection film, the insulating film formed on the light reflection film, and the transparent conductive film formed on the insulating film.

[Step-160]

Then, the front panel 130 and the back panel 100 are joined via the seal portion 121. Subsequently, by injecting a liquid crystal material into the gap between the front panel 130 and the back panel 100 and sealing the gap as appropriate, the liquid crystal display element 1 can be obtained.

In the above-described method for manufacturing, in [step-120], the dry etching method or the like is performed on the entire surface of the insulating film 106 under conditions that the insulating film 106 remains on the wall surface of each opening OP104 and that the insulating film 106 at the bottom portion of the opening OP104 is completely removed (see FIG. 9B). This treatment generally thins the insulating film 106, and this may lead to a varied film thickness.

A first modified example of the first embodiment will be described below. According to a method for manufacturing a liquid crystal display element according to the first modified example, the dry etching method or the like need not be performed on the entire surface of the insulating film 106.

FIGS. 13A, 13B, 14, 15A, 15B, and 16 are schematic partial end views for describing the method for manufacturing a liquid crystal display element according to the first embodiment.

[Step-1100]

First, [step-100] and the former half of [step-110], more specifically, steps until a mask 110 illustrated in FIG. 8A is formed are executed.

Figure 13A:
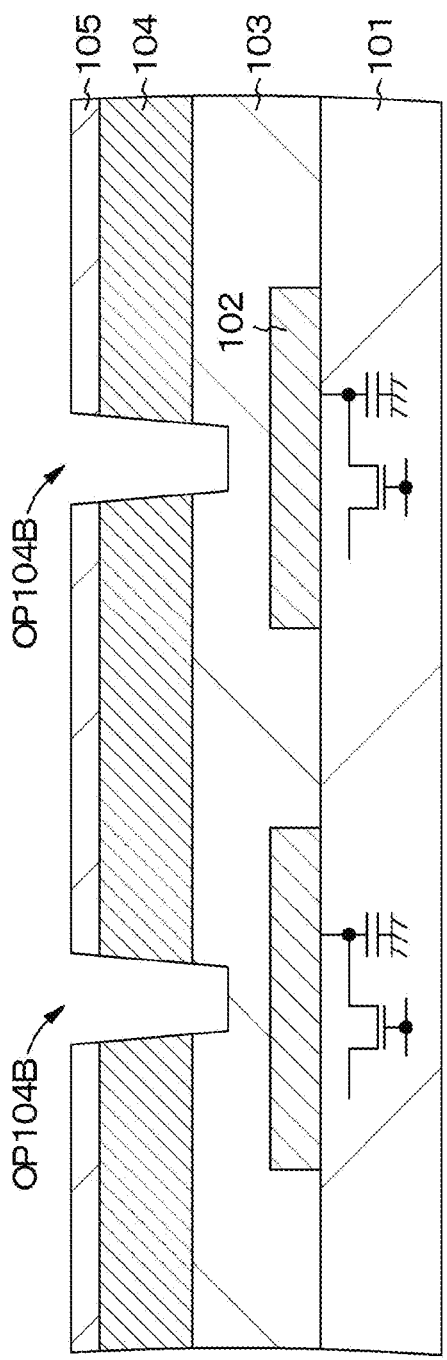
FIGS. 13A and 13B are schematic partial end views for describing a method for manufacturing a liquid crystal display element according to a first modified example of the first embodiment.
Figure 13B:
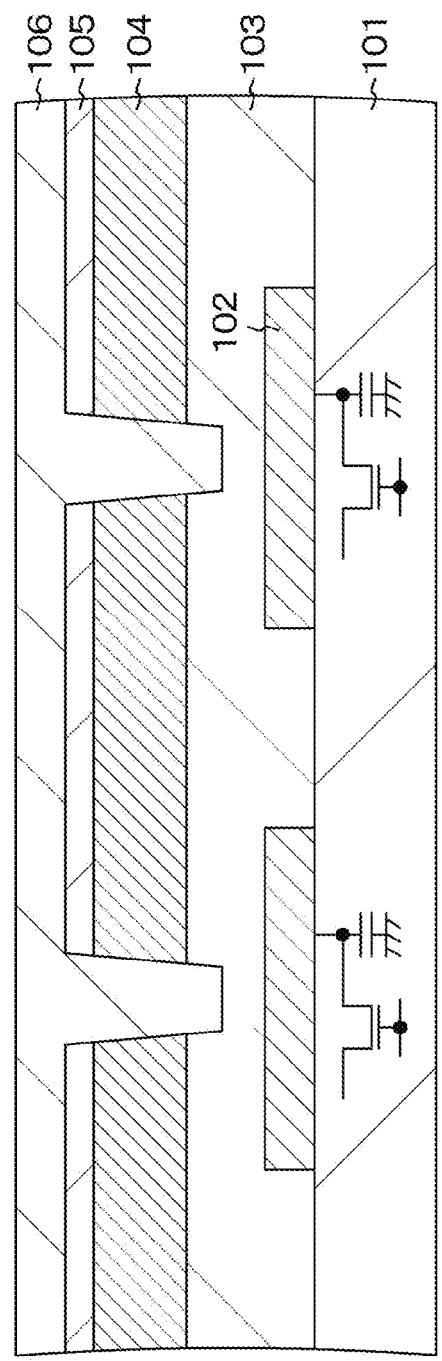

[Step-1110] (See FIGS. 13A and 13B)

Then, the dry etching method or the like is performed to form openings OP104B with the planarization film 103 exposed at a bottom portion of each of the openings OP104B, and the mask layer 110 is removed (see FIG. 13A). Subsequently, the insulating film 106 is formed on the entire surface including surfaces of the openings OP104B. The insulating film 106 is formed to fill an inside of each opening OP104B (see FIG. 13B).

Figure 14:
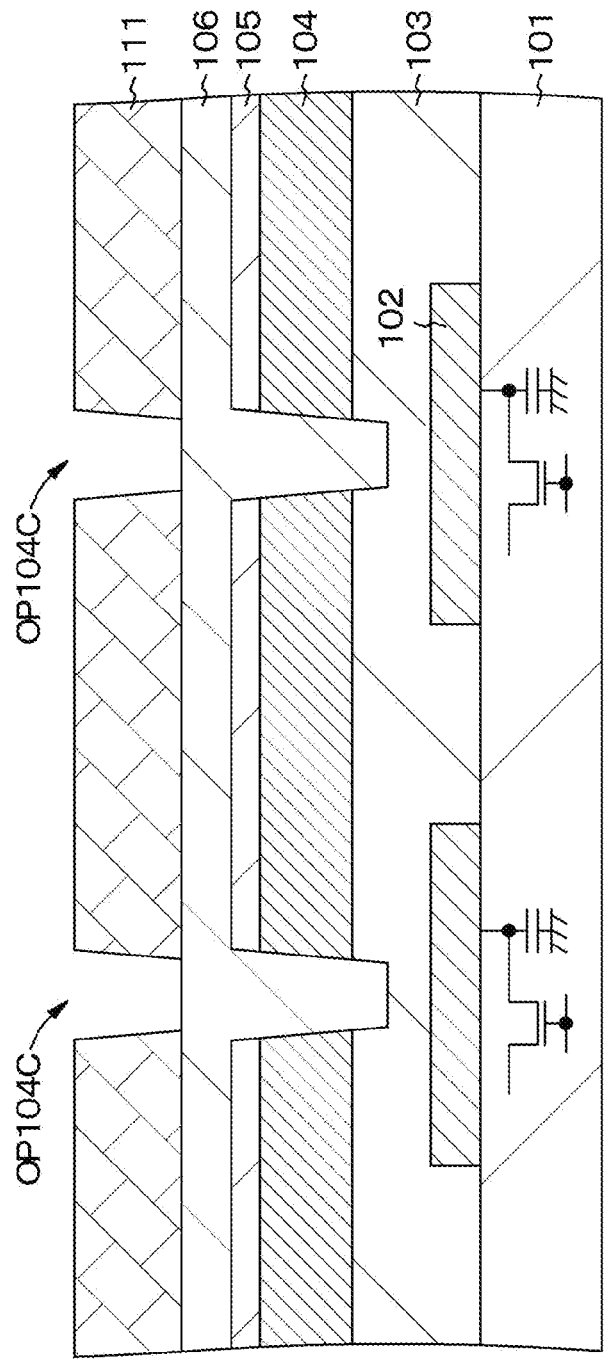
FIG. 14 is a schematic partial end view for describing the method for manufacturing a liquid crystal display element according to the first modified example of the first embodiment and is continued from FIG. 13B.
Figure 15A:
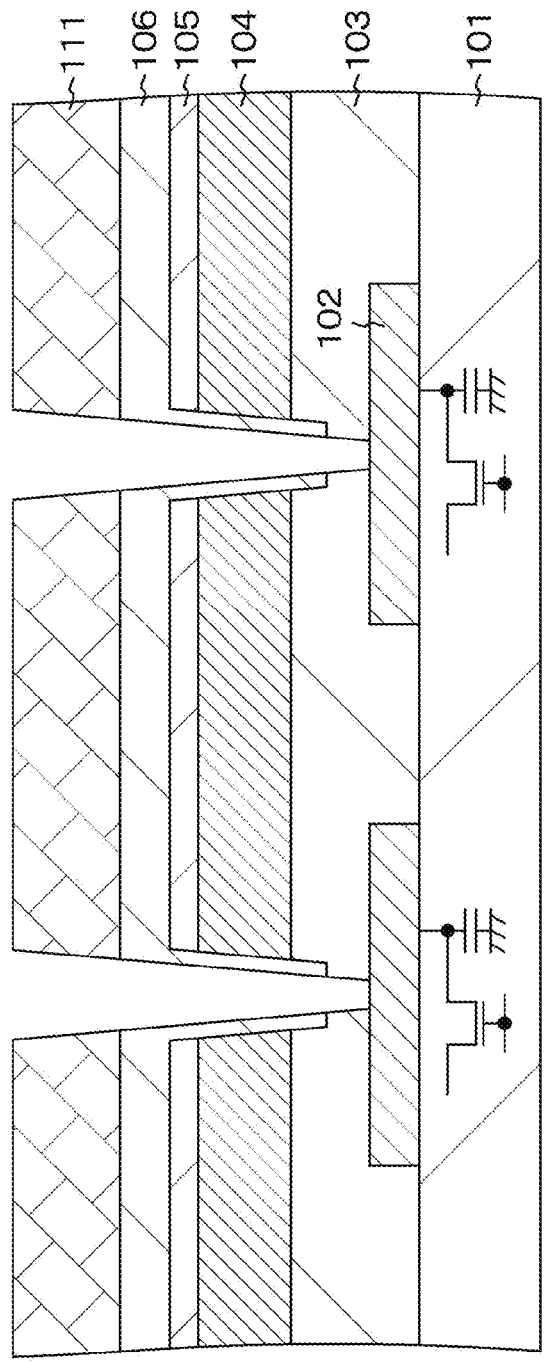
FIGS. 15A and 15B are schematic partial end views for describing the method for manufacturing a liquid crystal display element according to the first modified example of the first embodiment and are continued from FIG. 14.
Figure 15B:
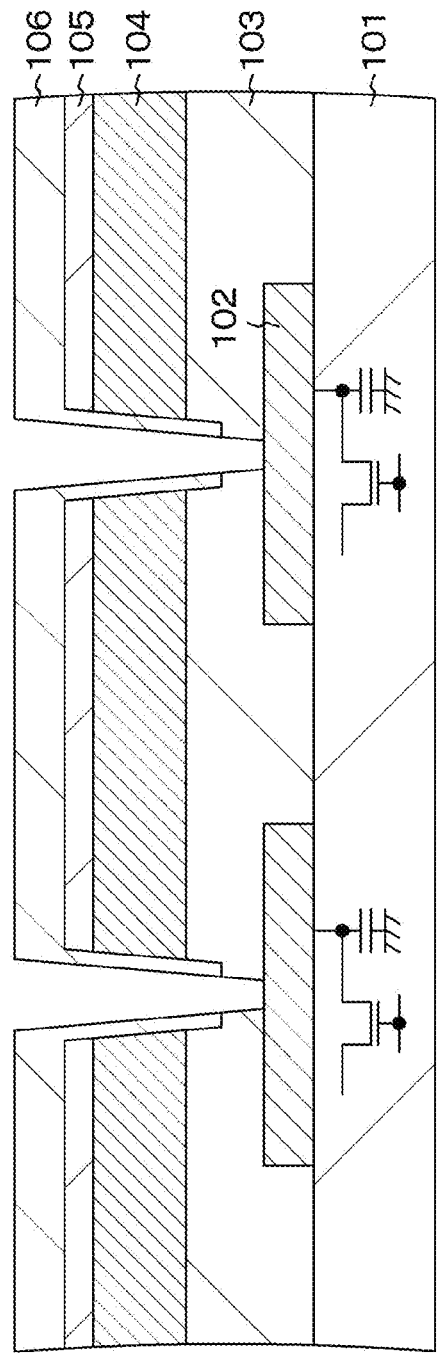

[Step-1120] (See FIGS. 14, 15A, and 15B)

Then, on the insulating film 106, a mask layer 111 is formed that includes openings OP104C corresponding to portions in which the vias 107 are to be disposed. Subsequently, the dry etching or the like is performed to form the openings OP104 with the drive electrode 102 exposed at the bottom portion of each of the openings OP104 (see FIG. 15A), and then the mask layer 111 is removed (see FIG. 15B).

Figure 16:
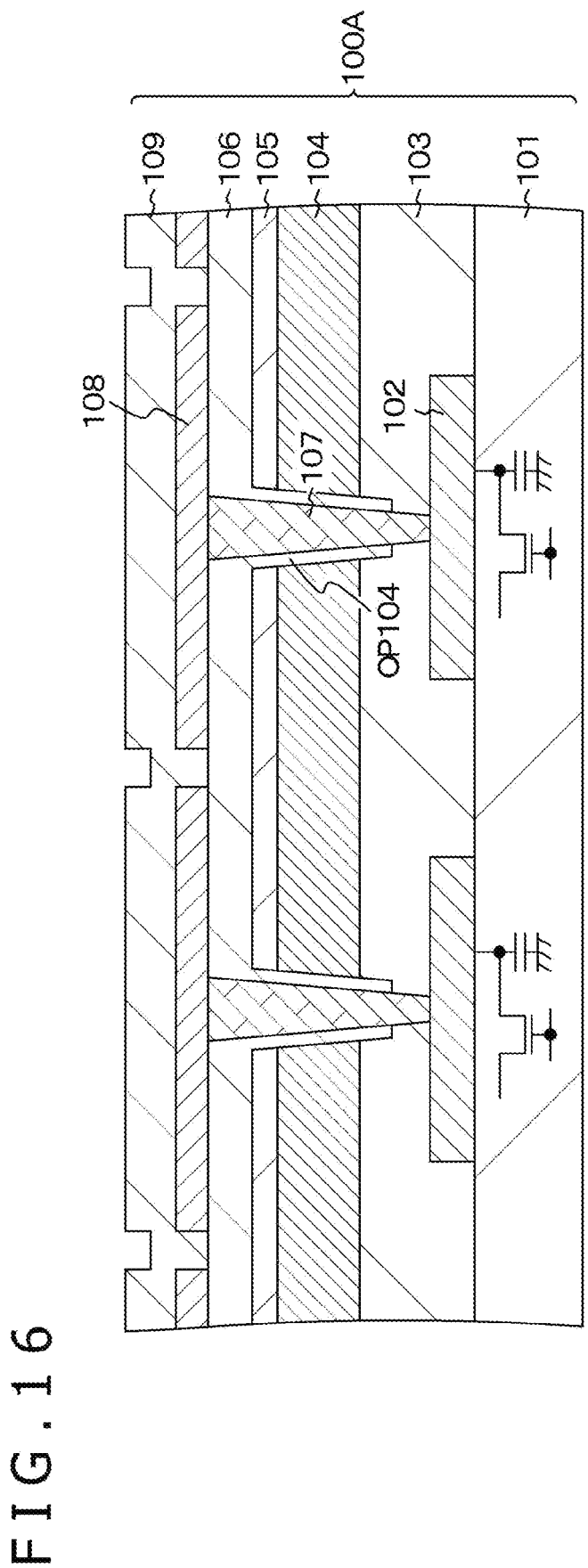
FIG. 16 is a schematic partial end view for describing the method for manufacturing a liquid crystal display element according to the first embodiment and is continued from FIG. 15B.

[Step-1130] (See FIG. 16)

Then, steps similar to [step-130], [step-140], and [step-150] are executed.

These steps allow a back panel 100A according to the first modified example to be obtained (see FIG. 16). Note that the back panel 100A differs from the back panel 100 illustrated in FIG. 12 in that a drive electrode-side portion of each via 107 also contacts the planarization film 103.

[Step-1140]

Then, the front panel 130 and the back panel 100A are joined via the seal portion 121. Subsequently, by injecting a liquid crystal material into the gap between the front panel 130 and the back panel 100A and sealing the gap as appropriate, the liquid crystal display element 1 can be obtained.

Various modifications can be made as necessary to the back panel obtained by the first embodiment. Modified examples will be described below with reference to the figures.

Figure 17:
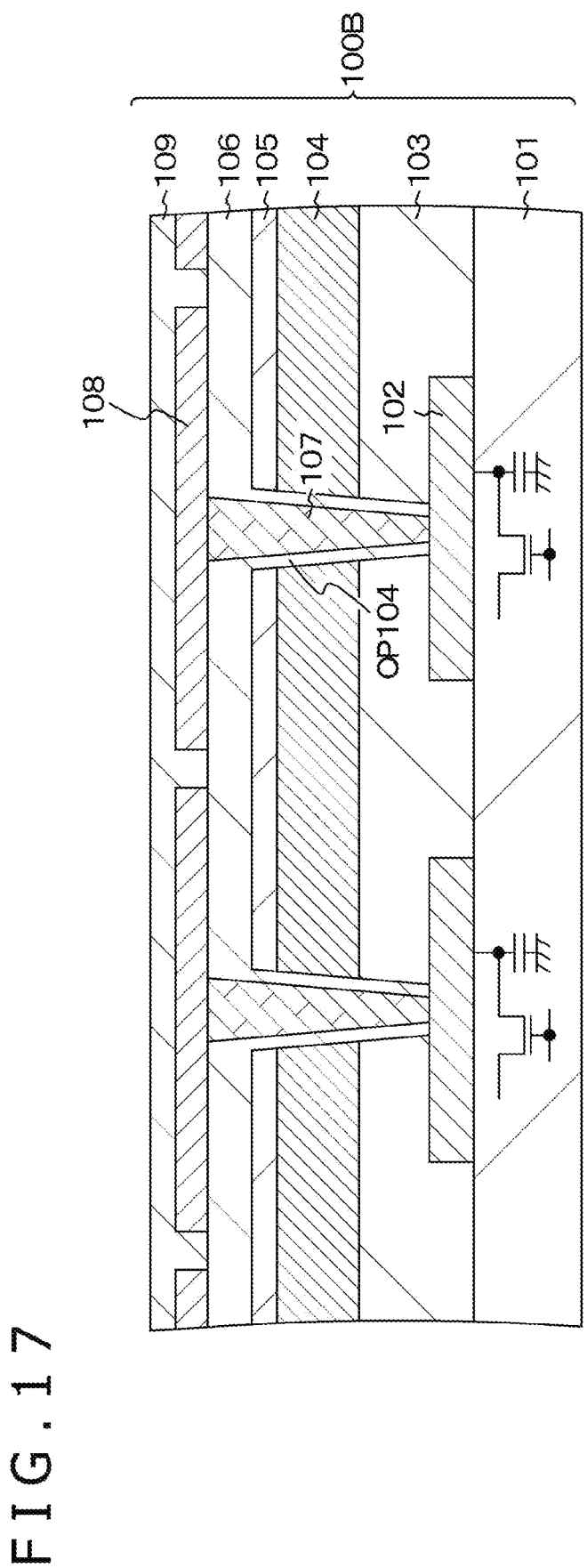
FIG. 17 is a schematic partial end view for describing a configuration of a back panel used in the liquid crystal display element according to a second modified example of the first embodiment.

Since the dielectric film 109 is formed on the entire surface including the surfaces of the transparent pixel electrodes 108, a level difference may be formed between the surface of a portion of the dielectric film 109 located at the gap and to which the transparent pixel electrode 108 is adjacent and the surface of a portion of the dielectric film 109 located at the transparent pixel electrode 108 (see FIG. 12 and the like). In a case where an adverse effect of such level differences is nonnegligible, it is sufficient if the configuration is subjected to planarization treatment for reducing the level differences in the dielectric film. FIG. 17 illustrates a back panel 100B according to a second modified example in which the dielectric film 109 is treated by polishing by CMP or the like for planarization.

Figure 18:
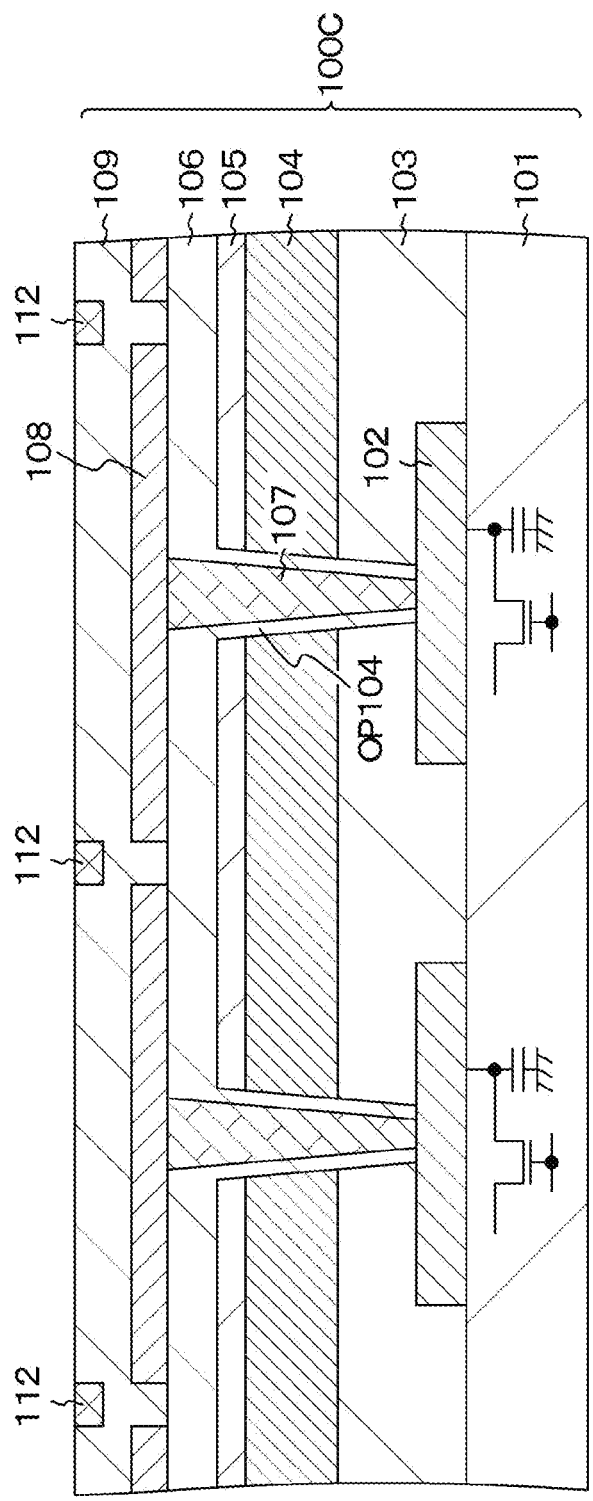
FIG. 18 is a schematic partial end view for describing a configuration of a back panel used in the liquid crystal display element according to a third modified example of the first embodiment.

Alternatively, measures may be taken such as filling of the level difference portions with a silicon oxide or the like. FIG. 18 illustrates a back panel 100C according to a third modified example in which treatment for filling the level difference portions is executed. For example, a silicon oxide or the like may be formed into a film on the entire surface of the dielectric film 109, and the resultant surface may further be planarized by CMP or the like. Reference sign 112 denotes portions filled with a silicon oxide or the like.

Figure 19:
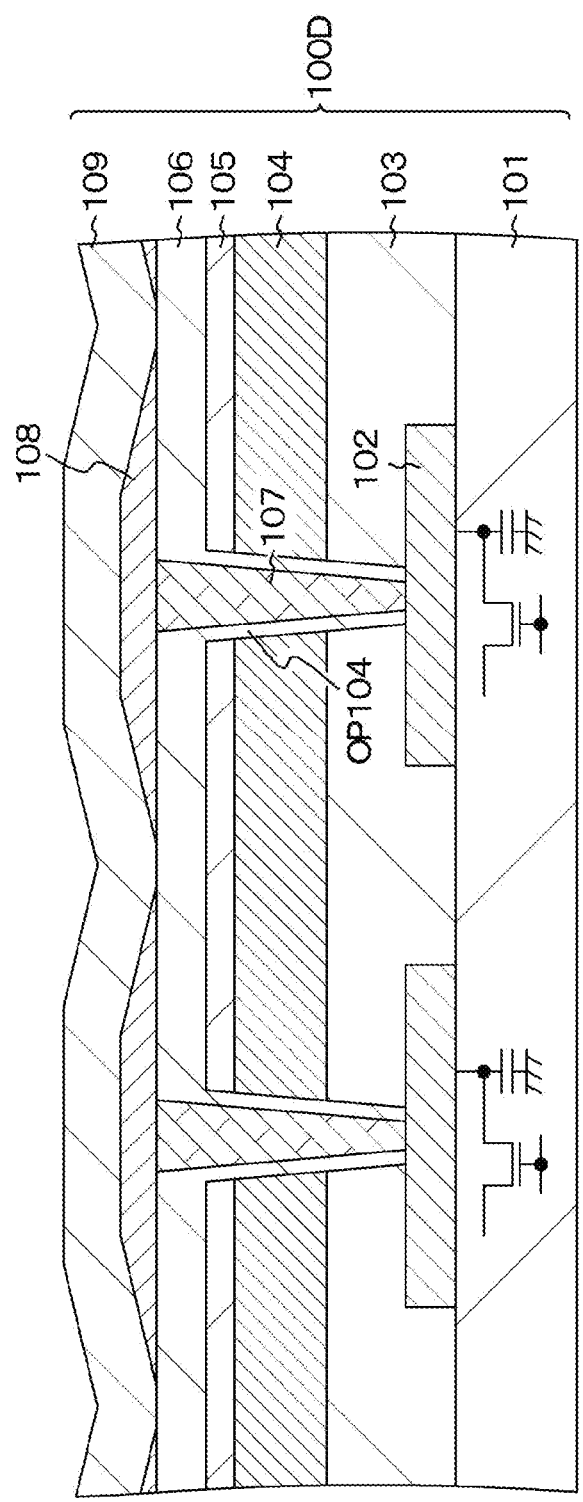
FIG. 19 is a schematic partial end view for describing a configuration of a back panel used in the liquid crystal display element according to a fourth modified example of the first embodiment.

Alternatively, after the transparent pixel electrodes 108 are formed, ends of each of the transparent pixel electrodes 108 can be tapered to make the level differences in the dielectric film 109 formed on the transparent pixel electrodes 108 gentler. FIG. 19 illustrates a back panel 100D according to a fourth modified example in which the ends of each transparent pixel electrode are tapered. For example, the ends of the transparent pixel electrode 108 are tapered using a step in which the transparent conductive film is patterned by wet etching to form the transparent pixel electrodes 108. An angle of the taper is desirably 40 degrees or smaller.

The modified examples related to smoothing of the dielectric film have been described. Modified examples for improving the light reflectivity of the vias will be described.

As illustrated in FIG. 4, a leading portion of the via 107 appears at the opening OP104 formed in the light reflection film 104. Accordingly, by replacing the leading portion of the via 107 with a material with high light reflectivity, reflection efficiency can be improved.

Figure 20:
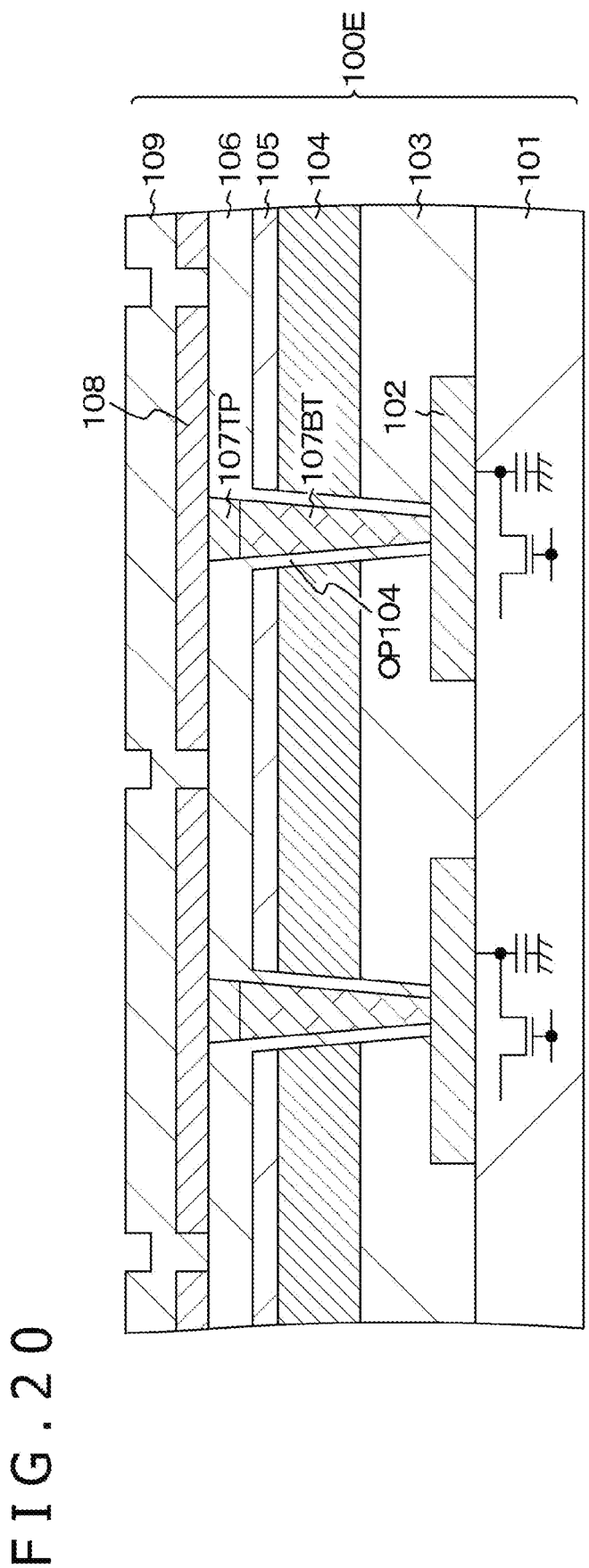
FIG. 20 is a schematic partial end view for describing a configuration of a back panel used in the liquid crystal display element according to a fifth modified example of the first embodiment.

FIG. 20 illustrates a back panel 100E according to a fifth modified example in which the leading portion and the bottom portion of the via include different materials. In the via 107, a bottom portion 107BT includes, for example, tungsten (W), and a leading portion 107PT includes, for example, Al—Ni.

Figure 21:
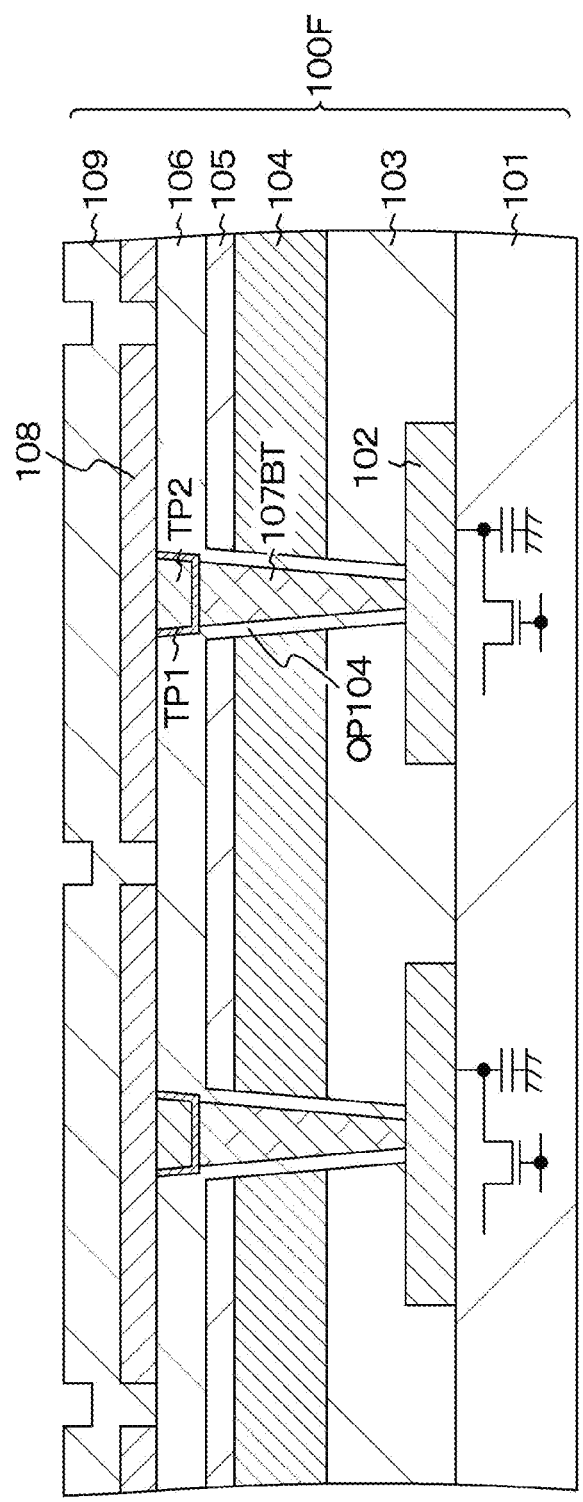
FIG. 21 is a schematic partial end view for describing a configuration of a back panel used in the liquid crystal display element according to a sixth modified example of the first embodiment.

FIG. 21 also illustrates a back panel 100F according to a sixth modified example in which the leading portion and the bottom portion of the via include different materials. In the via 107, the bottom portion 107BT includes, for example, tungsten (W), and an outer side TP1 of the leading portion includes, for example, TiN and an inner side of the leading portion includes, for example, Al—Cu. In a case where the transparent pixel electrode 108 includes an ITO, electric continuity between the ITO and Al—Cu is difficult to achieve but can be achieved via TiN.

Figure 22:
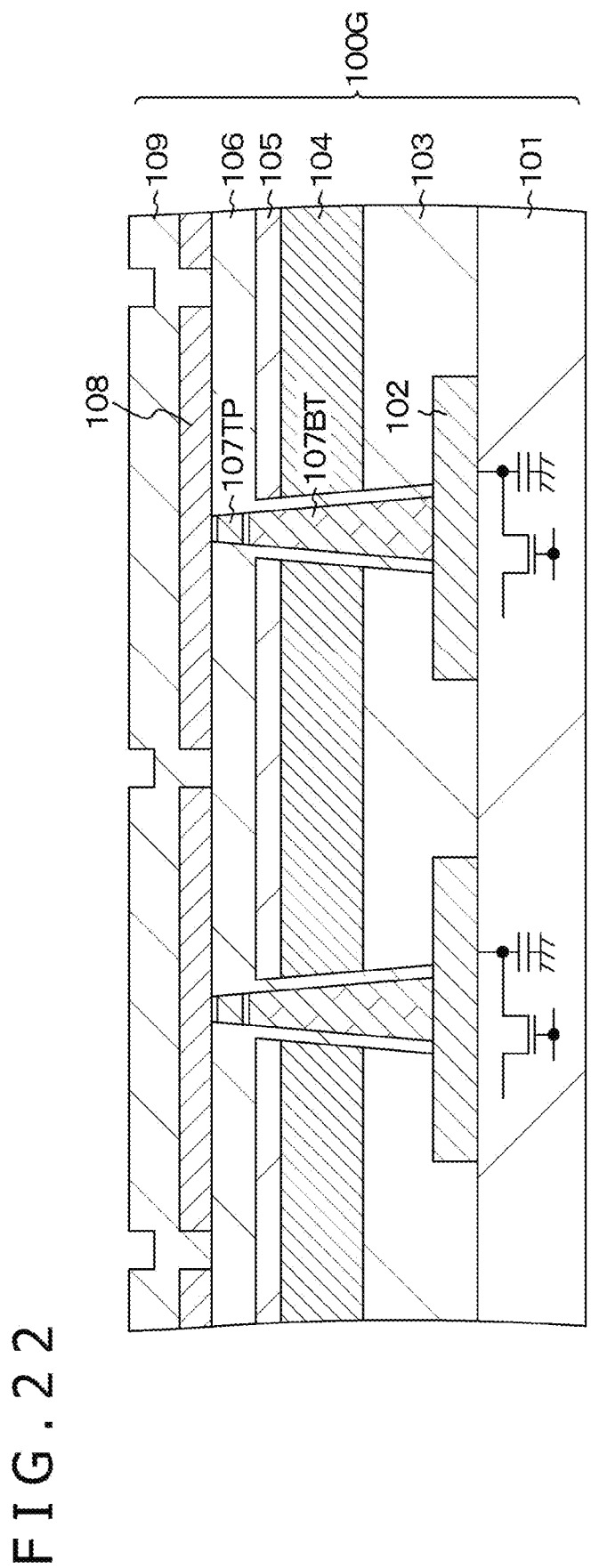
FIG. 22 is a schematic partial end view for describing a configuration of a back panel used in the liquid crystal display element according to a seventh modified example of the first embodiment.

FIG. 22 also illustrates a back panel 100G according to a seventh modified example in which the leading portion and the bottom portion of the via include different materials. In this example, the via is formed from a back surface side, and the leading portion has a lamination configuration of Ti/Al—Cu/TiN, while the bottom portion includes tungsten (W).

Second Embodiment

The second embodiment relates to an electrode structure, a method for manufacturing the electrode structure, a liquid crystal display element, and electronic equipment according to the present disclosure.

In a case where the light reflection film is formed to be electrically floating, then, for example, the light reflection film may be charged during a process for manufacturing a back panel, causing electrostatic breakdown. Thus, the second embodiment provides a configuration in which the light reflection film is connected to an electrode for voltage supply formed in a lower layer underlying the light reflection film. The steps executed after formation of the light reflection film are performed with a predetermined voltage supplied to the light reflection film.

For example, it is sufficient if an internal configuration of a liquid crystal display element 2 and the like according to the second embodiment are understood by replacing the liquid crystal display element 1 with the liquid crystal display element 2 and the back panel 100 with a back panel 200 in FIGS. 2A and 2B, and the internal configuration will thus not be described.

Figure 23:
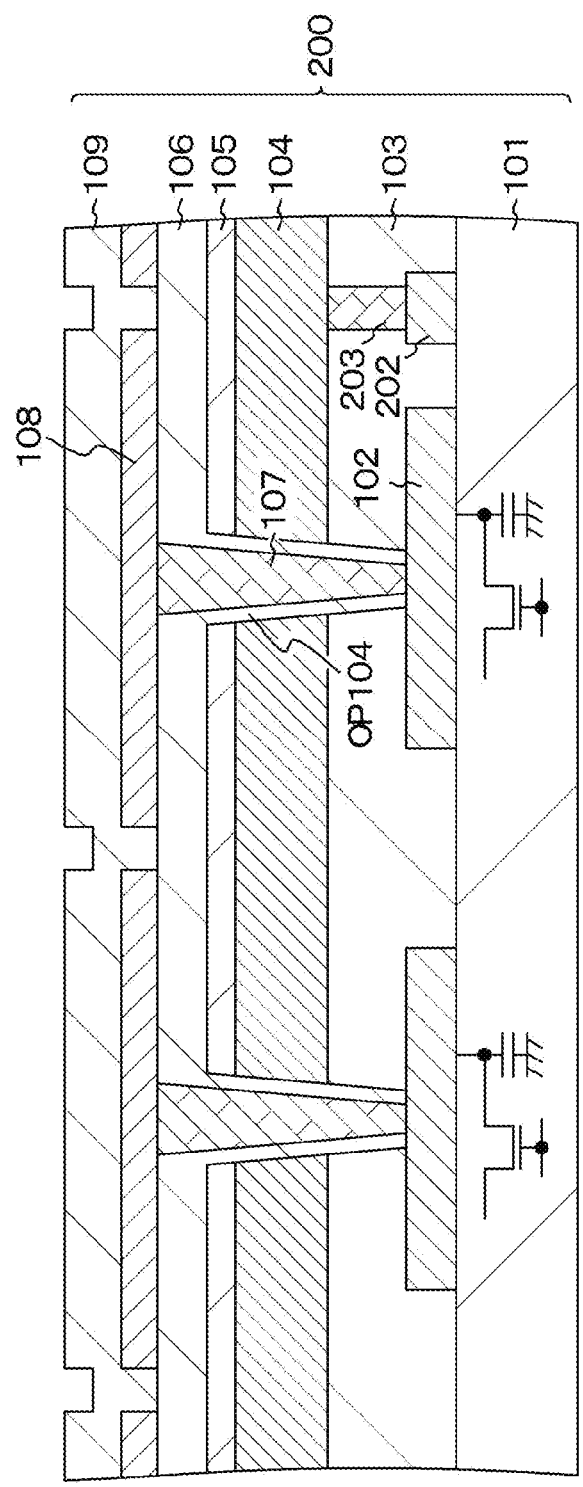
FIG. 23 is a schematic partial cross-sectional view for describing a structure of a back panel used in a liquid crystal display element according to a second embodiment.

FIG. 23 is a schematic partial cross-sectional view for describing the structure of the back panel used in the liquid crystal display element according to the second embodiment.

In the back panel 200, an electrode for voltage supply 202 is provided that is formed in a lower layer underlying the light reflection film 104. The electrode for voltage supply 202 is formed, for example, in the same layer as that in which the drive electrodes 102 are formed. Reference sign 203 denotes a contact plug electrically connecting the electrode for voltage supply 202 and the light reflection film 104.

FIGS. 24A, 24B, 25A, 25B, 26A, 26B, 27A, 27B, and 28 are schematic partial end views for describing the method for manufacturing a liquid crystal display element according to the second embodiment. With reference to these figures, the method for manufacturing the liquid crystal display element 2 will be described in detail.

Figure 24A:
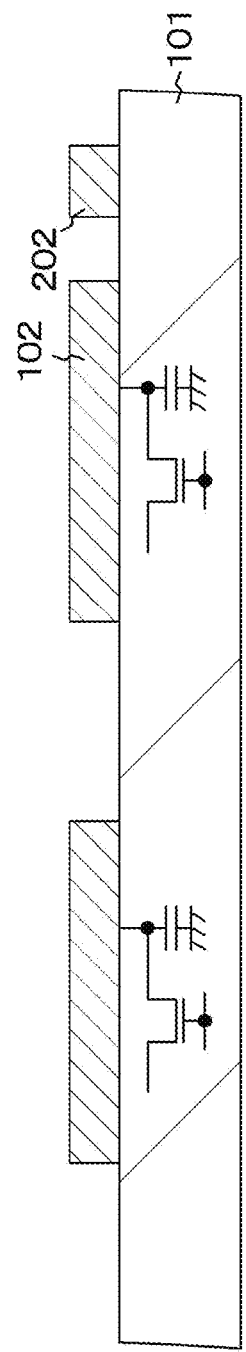
FIGS. 24A and 24B are schematic partial end views for describing a method for manufacturing a liquid crystal display element according to the second embodiment.
Figure 24B:
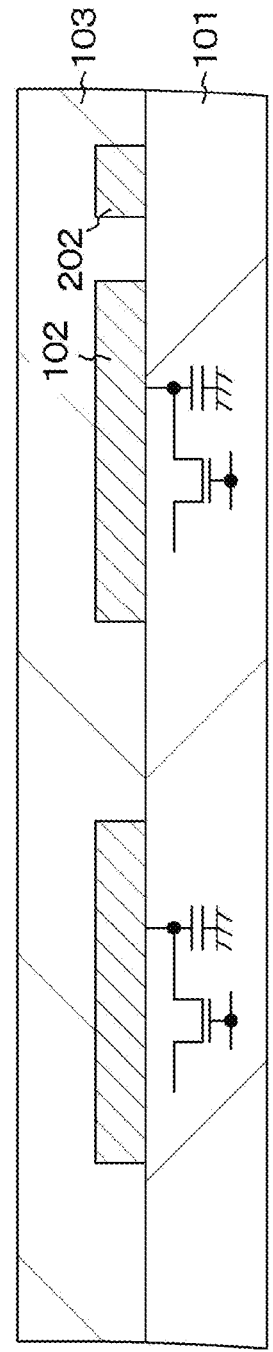

[Step-200] (See FIGS. 24A and 24B)

The substrate 101 provided with the drive circuits is prepared, and the drive electrodes 102 and the electrode for voltage supply 202 are formed on the substrate 101 by a well-known film formation method or patterning method (see FIG. 24A). The drive electrodes 102 and the electrode for voltage supply 202 include an aluminum alloy, for example, Al—Cu. Note that, for an improved electric contact characteristic, for example, a barrier metal such as TiN may be formed on each of the electrodes. Subsequently, the planarization film 103 including, for example, a silicon oxide is formed on the entire surface including the surfaces of the drive electrodes 102 and the electrode for voltage supply 202 (see FIG. 24B).

Figure 26A:
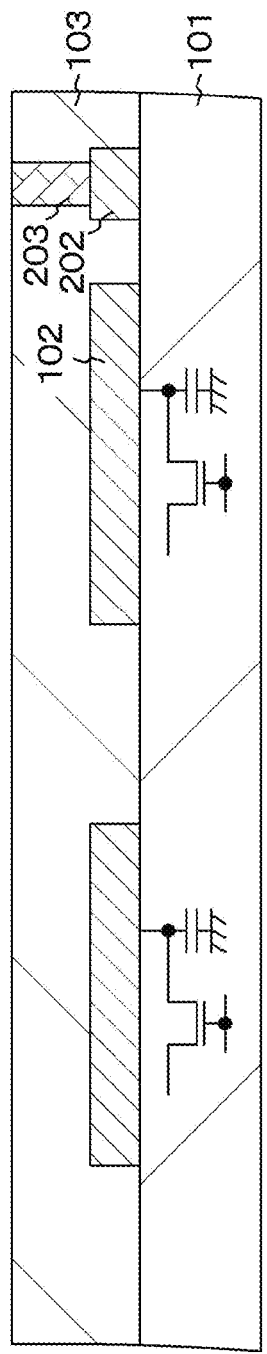
FIGS. 26A and 26B are schematic partial end views for describing the method for manufacturing a liquid crystal display element according to the second embodiment and are continued from FIG. 25B.

[Step-210] (See FIGS. 25A, 25B, and 26A)

Then, an opening OP203 corresponding to a portion in which the contact plug 203 is to be disposed is formed in the planarization film 103 (FIG. 24A). Subsequently, on the entire surface of the planarization film 103 including a surface of the opening OP203, a conductive material layer 203A forming the contact plug 203 is formed using, for example, tungsten (W) (see FIG. 25B). Then, planarization is performed by, for example, CMP to form the contact plug 203 embedded in the opening (see FIG. 26A).

Figure 26B:
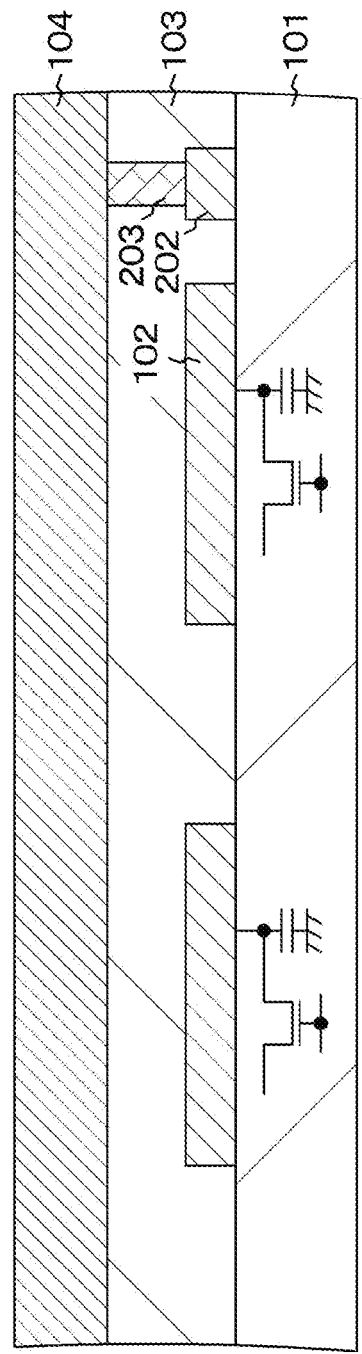

[Step-220] (See FIG. 26B)

Then, the light reflection film 104 including an aluminum alloy, for example, Al—Cu is formed.

The subsequent steps are basically similar to the corresponding steps described in the first embodiment. However, in the second embodiment, the steps executed after formation of the light reflection film are performed with a predetermined voltage supplied to the light reflection film.

Figure 27A:
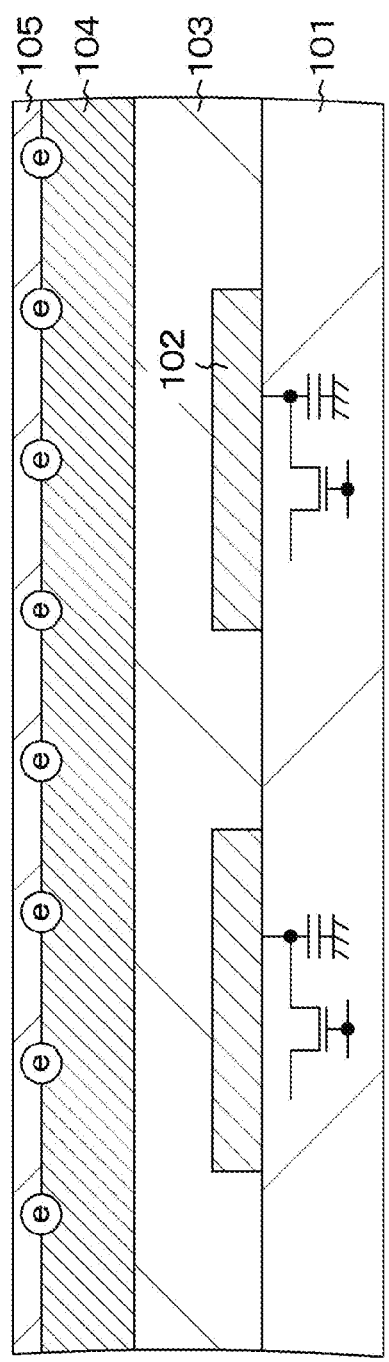
FIG. 27A is a schematic diagram illustrating a state of charge generated in the light reflection film during steps of manufacturing the back panel used in the liquid crystal display element according to the first embodiment.
Figure 27B:
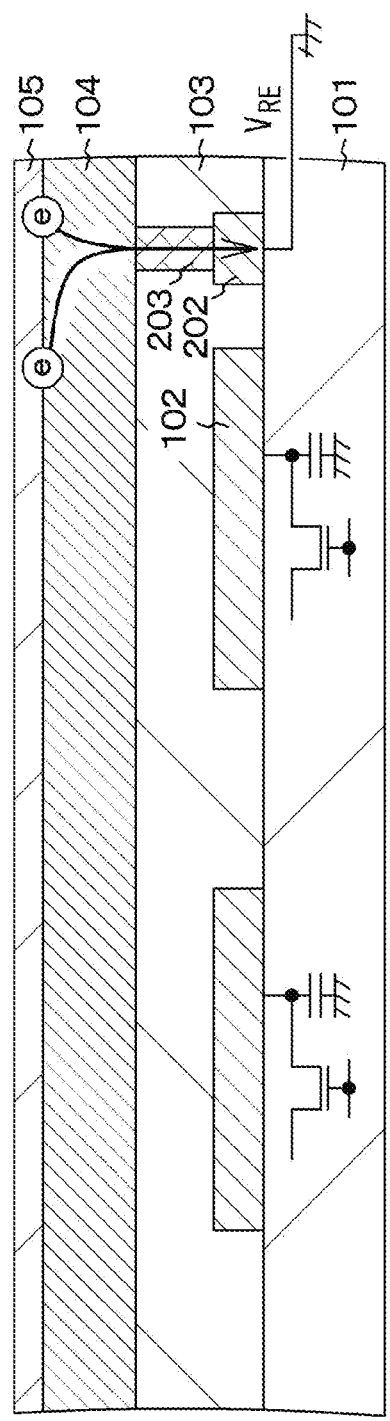
FIG. 27B is a schematic diagram illustrating a state of removal of charge generated in the light reflection film during the steps of manufacturing the back panel used in the liquid crystal display element according to the second embodiment.

In a case where the light reflection film 104 is formed to be electrically floating, then charging of the light reflection film 104 results from execution of a process for forming the insulating film 105 on the light reflection film 104 (see FIG. 27A). In particular, significant charging occurs in a case where a plasma-based facility is used for film formation, dry etching, or the like. The charging may cause various insulating films to be subjected to electrostatic breakdown.

In the second embodiment, the steps executed after formation of the light reflection film 104 are performed with a predetermined voltage supplied to the light reflection film. An example illustrated in FIG. 27B indicates a case where, for example, a voltage $V_{RE}$ corresponding to a ground voltage is supplied to the light reflection film 104. In this case, even in a case where the light reflection film 104 is charged, the charge flows to the outside. This allows mitigation of charging that may cause electrostatic breakdown.

Figure 28:
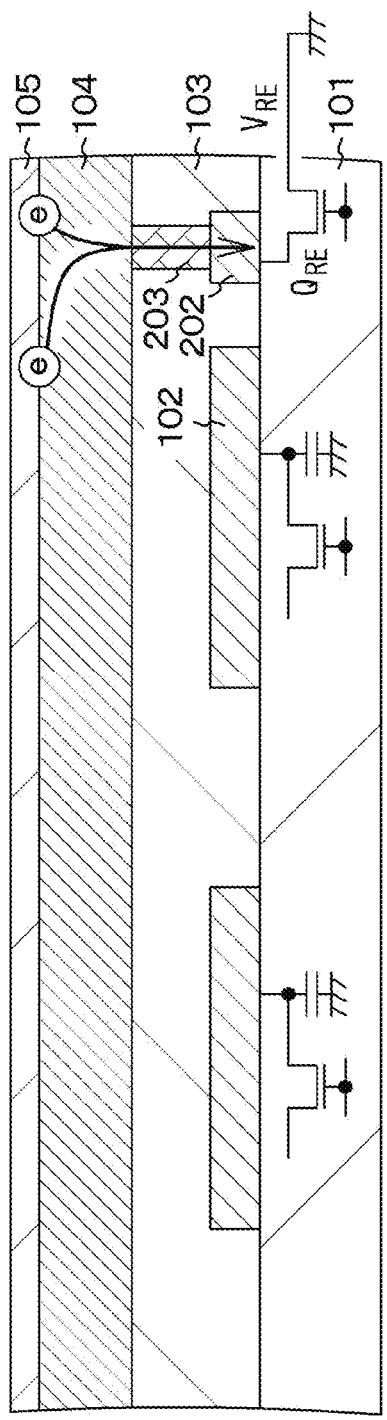
FIG. 28 is a schematic diagram illustrating a state of removal of charge generated in the light reflection film during steps of manufacturing the back panel according to a modified example.

Note that the configuration may be such that the electrode for voltage supply 202 is supplied with the voltage $V_{RE}$ via a switching transistor $Q_{RE}$ provided on the substrate 101 as illustrated in FIG. 28. In this configuration, it is sufficient if the light reflection film 104 is supplied with a voltage by applying the voltage to a gate electrode to make the switching transistor $Q_{RE}$ electrically conductive.

Third Embodiment

A third embodiment relates to a method for driving a liquid crystal display element according to the present disclosure.

In the third embodiment, when the liquid crystal display element is driven, the light reflection film is in any one of an electrically floating state, a state in which a voltage of an electrically positive polarity is applied to the light reflection film, or a state in which a voltage of an electrically negative polarity is applied to the light reflection film. In a case where a voltage is applied to the light reflection film, the voltage may be fixedly or dynamically applied.

Figure 29:
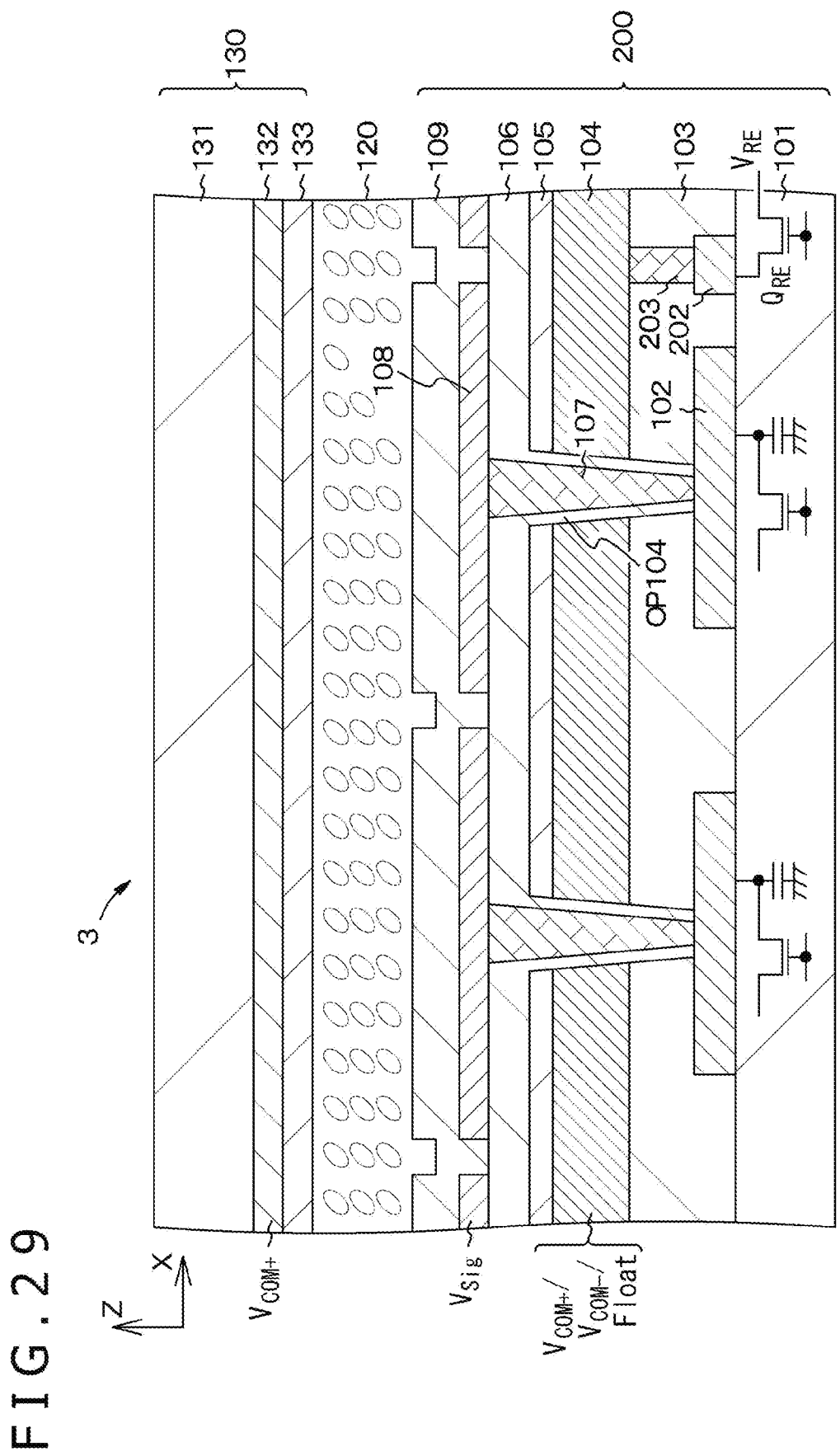
FIG. 29 is a schematic diagram for describing an example of voltages supplied to a light reflection film in a liquid crystal display element according to a third embodiment.
Figure 30:
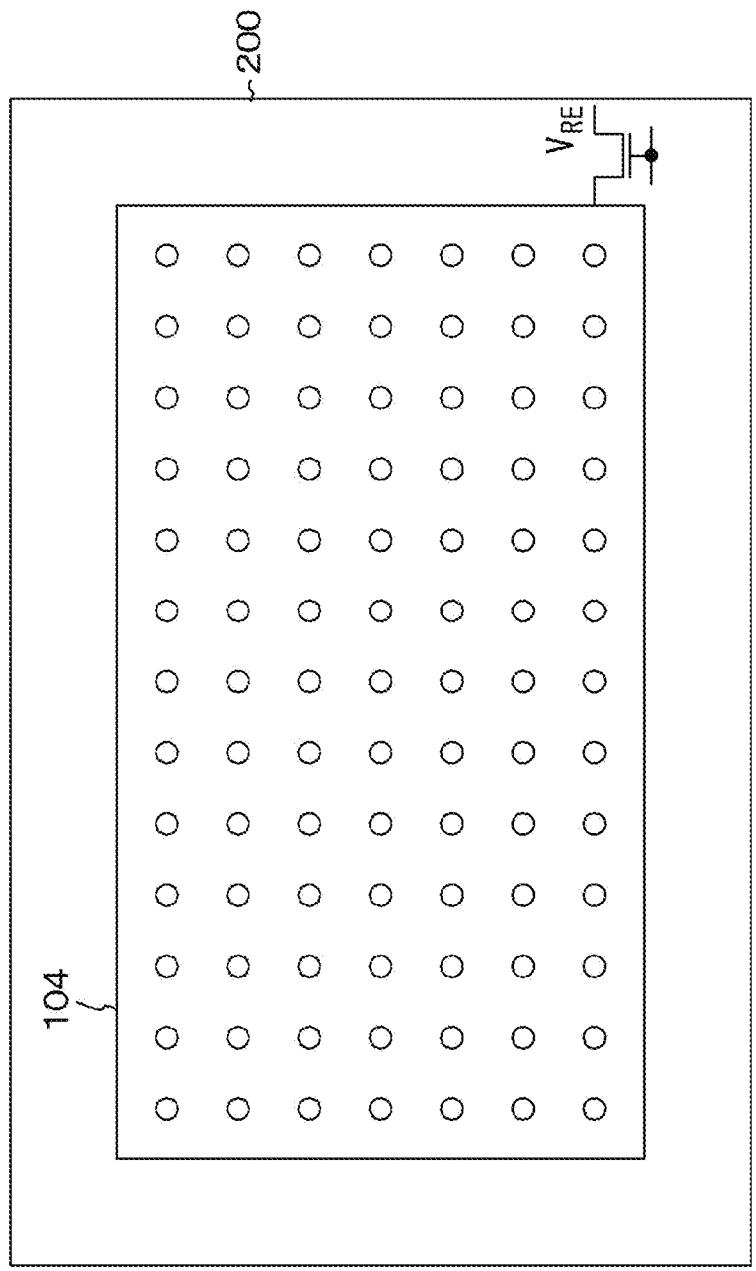
FIG. 30 is a schematic plan view for describing a configuration of a light reflection film in a back panel used in the liquid crystal display element according to the third embodiment.

FIG. 29 is a schematic diagram for describing an example of the voltage supplied to the light reflection film in the liquid crystal display element according to the third embodiment. FIG. 30 is a schematic plan view for describing a configuration of a light reflection film in a back panel used in the liquid crystal display element according to the third embodiment.

A liquid crystal display element 3 according to the third embodiment is basically configured using the back panel 200 described in the second embodiment, with the electrode for voltage supply 202 supplied with the voltage VRE via the switching transistor QRE provided on the substrate 101 as illustrated in FIG. 28. It is sufficient if an internal configuration of the liquid crystal display element 3 and the like are understood by replacing the liquid crystal display element 1 with the liquid crystal display element 3 and the back panel 100 with the back panel 200 in FIGS. 2A and 2B, and the internal configuration will thus not be described.

Figure 31:
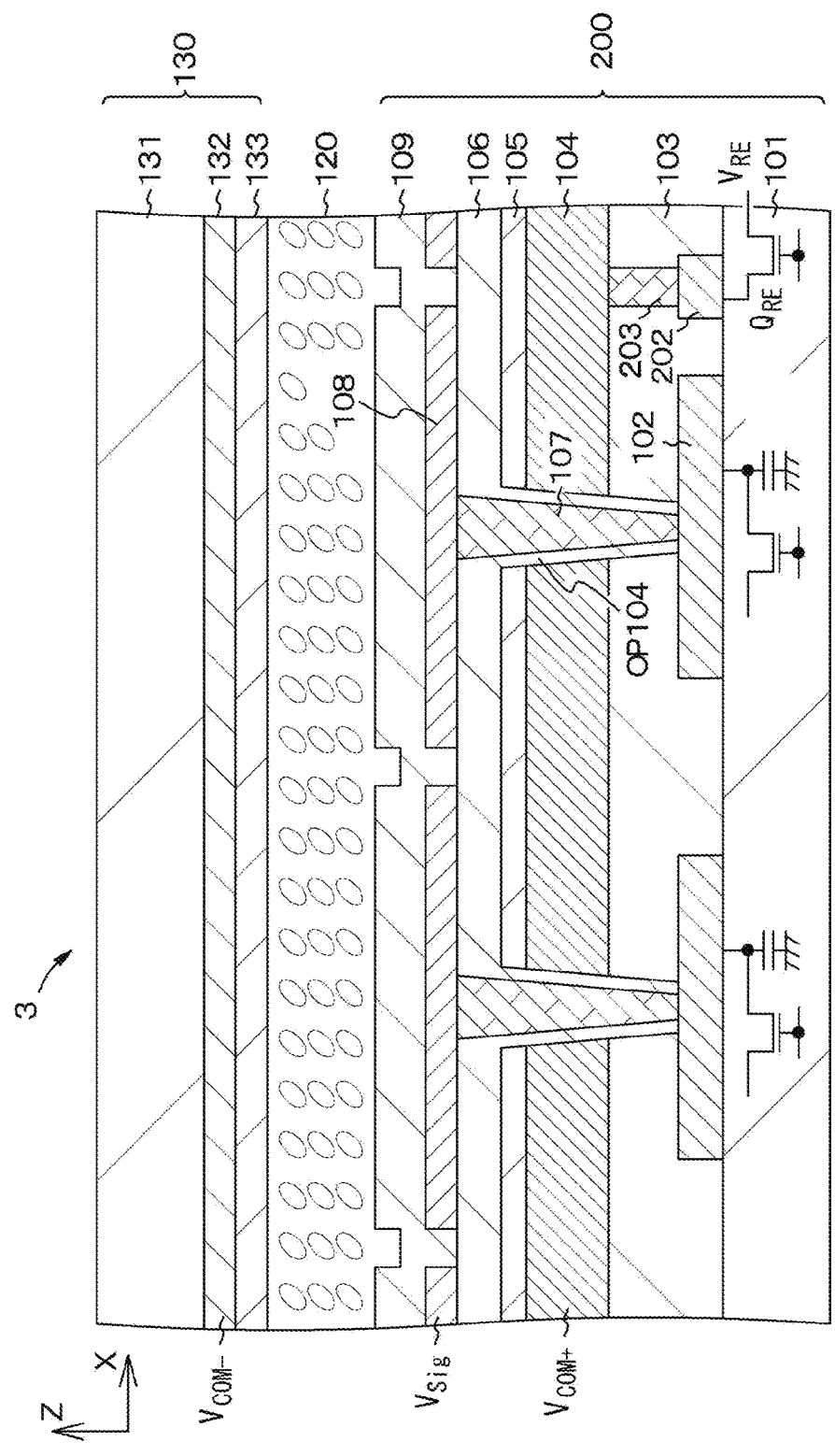
FIG. 31 is a schematic diagram for describing an example of voltages supplied to the light reflection film in the liquid crystal display element according to the third embodiment.

For prevention of degradation, the liquid crystal material layer is normally supplied with a voltage with alternating polarity. In a case where a voltage of alternating polarity is applied to the counter electrode, an operation can be performed in which, immediately before the voltage polarity of the counter electrode 132 is switched, a voltage of the opposite polarity is applied to the light reflection film 104 to switch the orientation direction of liquid crystal in the entire surface at a time as illustrated in FIG. 31. This allows the responsiveness of liquid crystal to be improved.

Figure 32:
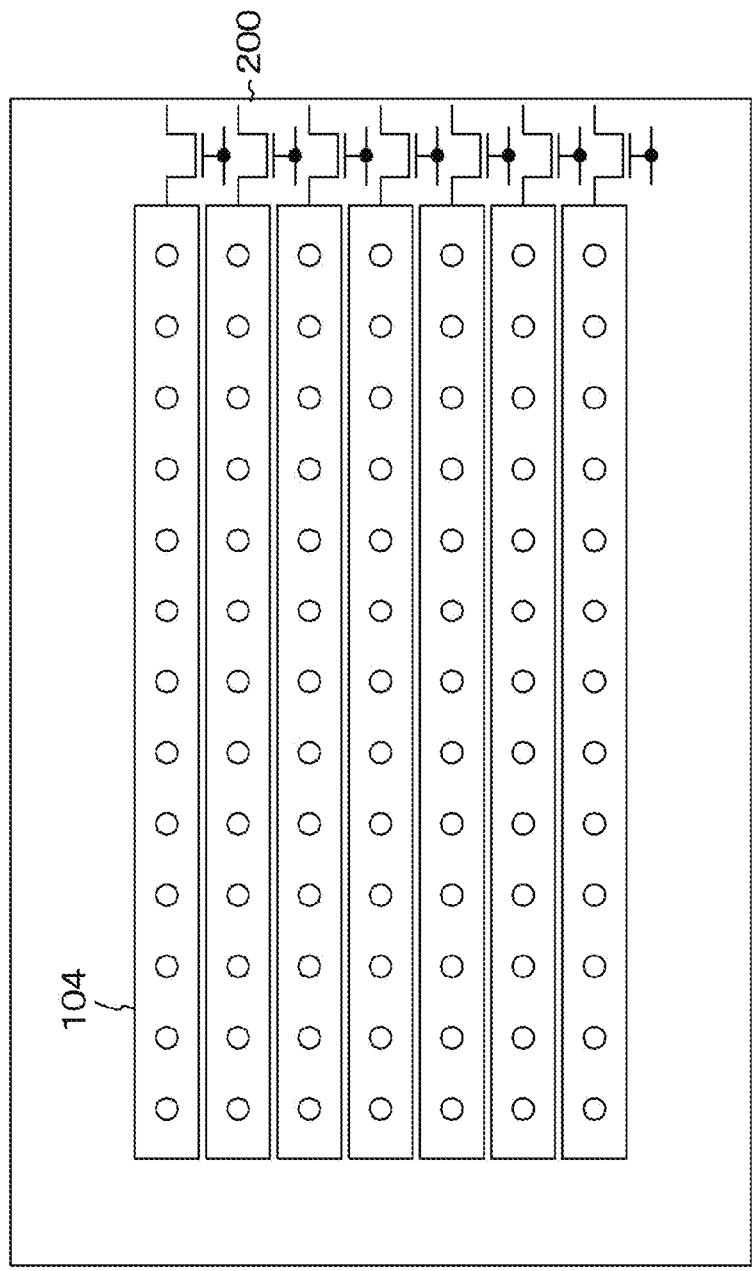
FIG. 32 is a schematic plan view for describing a configuration of another example of the light reflection film in the back panel used in the liquid crystal display element according to the third embodiment.

Note that, in some cases, the liquid crystal display element may be configured such that the light reflection film 104 is divided into strip-like pieces corresponding to a group of the transparent pixel electrodes arranged in the row direction and that the strip-like pieces are connected to separately provided respective electrodes for voltage supply and supplied with respective separate voltages as illustrated in FIG. 32.

In the electrode structure according to the present disclosure, the transparent conductive film is divided into pieces in a two-dimensional matrix at a predetermined pitch to form transparent pixel electrodes. Each of the transparent pixel electrodes is connected to a corresponding one of drive electrodes formed in a lower layer underlying the light reflection film, through a corresponding one of vias penetrating the insulating film and the light reflection film and insulated from the light reflection film. According to this configuration, light is reflected exclusively by the light reflection film, and thus, a reduced pixel pitch is prevented from reducing the aperture ratio and from affecting the optical characteristics due to a difference in position between the pixel electrodes and the light reflection film.

[Description of Electronic Equipment]

The liquid crystal display element of the present disclosure described above can be used as a display section (display apparatus) of electronic equipment in any fields in which a video signal input to or generated in the electronic equipment is displayed as an image or a video. By way of example, the liquid crystal display element can be used as a display section of, for example, a television set, a digital still camera, a notebook personal computer, a portable terminal apparatus such as a cellular phone, a video camera, a head-mounted display, or the like.

The liquid crystal display element of the present disclosure includes a liquid crystal display element with a sealed configuration and a module shape. By way of example, such a liquid crystal display element corresponds to a display module formed by attaching an opposite portion such as transparent glass to an image array section. Note that the display module may be provided with a circuit section, a flexible printed circuit (FPC), or the like for inputting external signals to the image array section and outputting signals to the outside. As specific examples of electronic equipment using the liquid crystal display element of the present disclosure, a projective display apparatus, a digital still camera, and a head-mounted display will be illustrated below. However, the illustrated specific examples are illustrative only, and the present disclosure is not limited to the examples.

Specific Example 1

Figure 33:
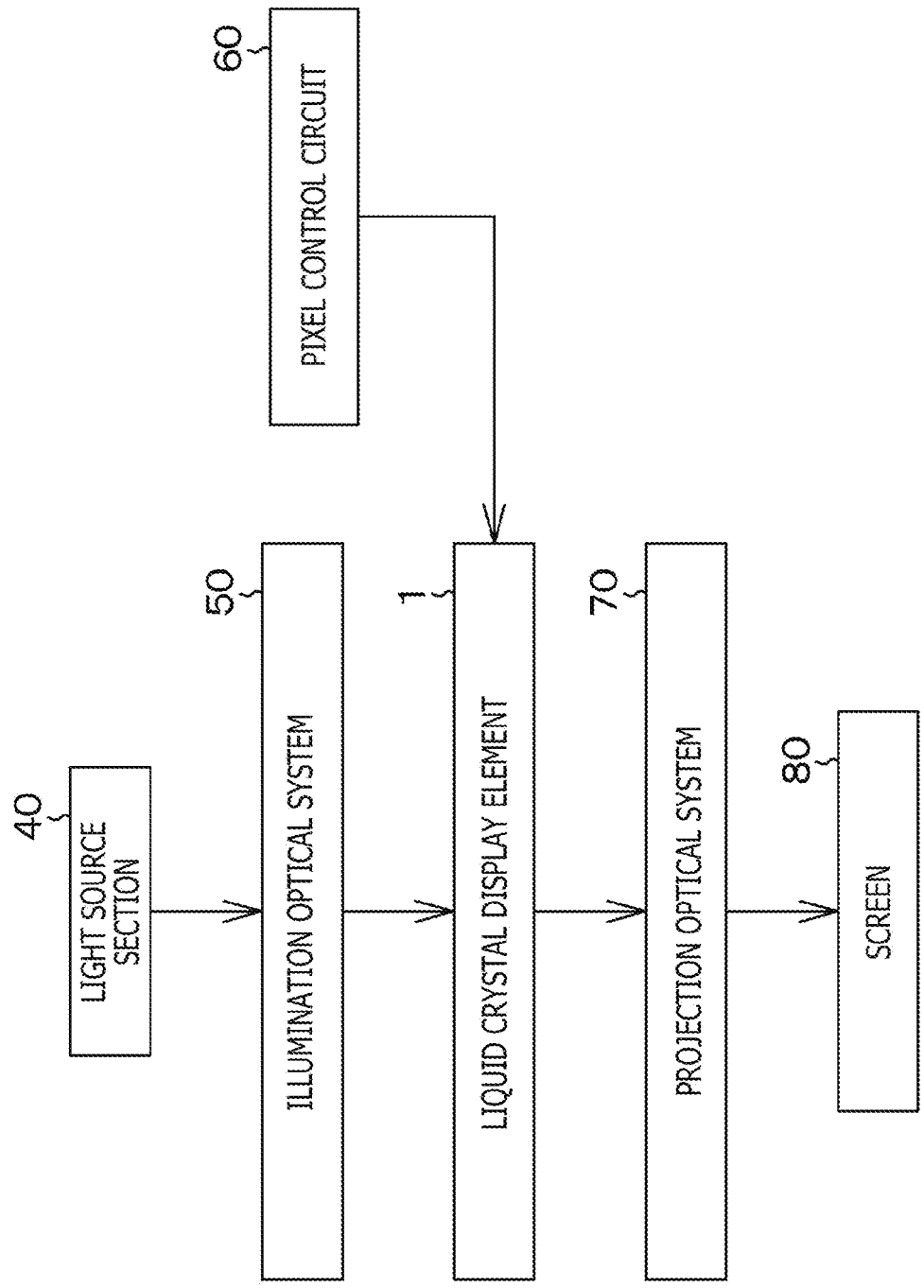
FIG. 33 is a conceptual drawing of a projective display apparatus.

FIG. 33 is a conceptual diagram of a projective display apparatus using the liquid crystal display element of the present disclosure. The projective display apparatus includes a light source section 40, an illumination optical system 50, the liquid crystal display element 1, an image control circuit 60 that drives the liquid crystal display element, a projection optical system 70, a screen 80, and the like. The light source section 40 can include, for example, any of various lamps such as a xenon lamp, and a semiconductor light emitting element such as a light emitting diode. The illumination optical system 50 is used to guide light from the light source section 40 to the liquid crystal display element 1 and includes optical elements such as a prism and a dichroic mirror. The liquid crystal display element 1 acts as a light valve and projects an image on the screen 80 via the projection optical system 70.

Specific Example 2

Figure 34A:
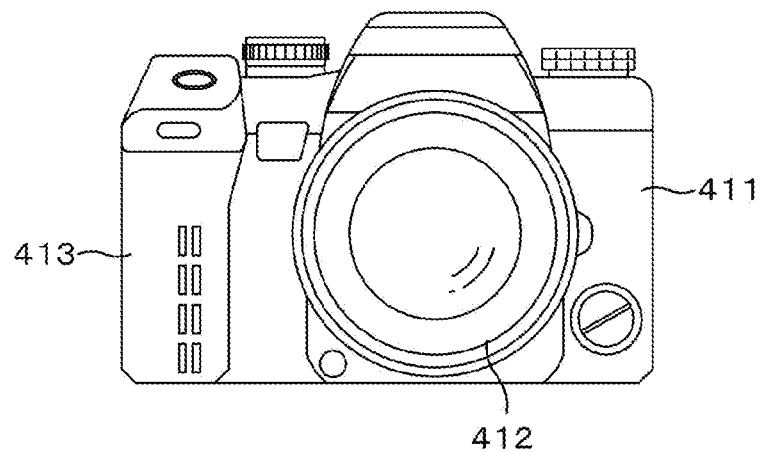
FIGS. 34A and 34B is an are appearance diagrams of an interchangeable single lens reflex type digital still camera.
Figure 34B:
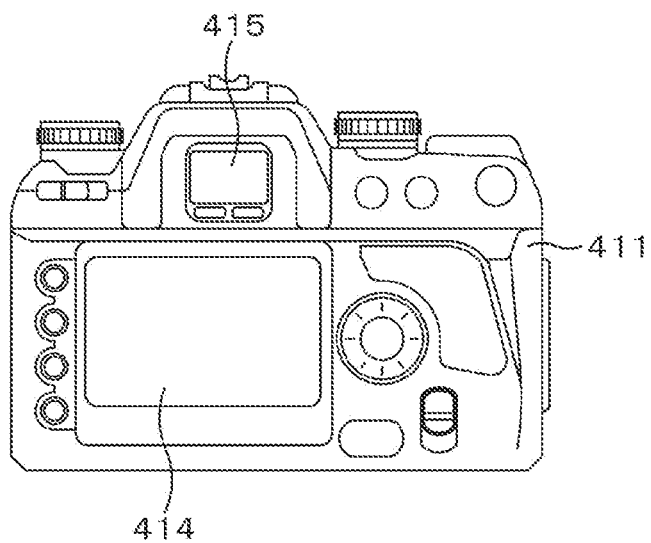

FIGS. 34A and 34B are appearance diagrams of an interchangeable single lens reflex type digital still camera; FIG. 34A is a front view of the digital still camera, and FIG. 34B is a rear view of the digital still camera. The interchangeable single lens reflex type digital still camera includes, for example, on a right front side of a camera main body portion (camera body) 411, an interchangeable image capturing lens unit (interchangeable lens) 412, and on a left front side of the camera main body portion, a grip portion 413 gripped by a photographer.

The camera main body portion 411 is provided with a monitor 414 substantially at a center of a rear surface. A view finder (ocular window) 415 is provided above the monitor 414. The photographer can look in the view finder 415 to view an optical image of a subject guided from the image capturing lens unit 412 to determine a composition.

In the interchangeable single lens reflex type digital still camera configured as described above, the liquid crystal display element of the present disclosure can be used as the view finder 415. In other words, the interchangeable single lens reflex type digital still camera according to the present example is produced by using the liquid crystal display element of the present disclosure as the view finder 415.

Specific Example 3

Figure 35:
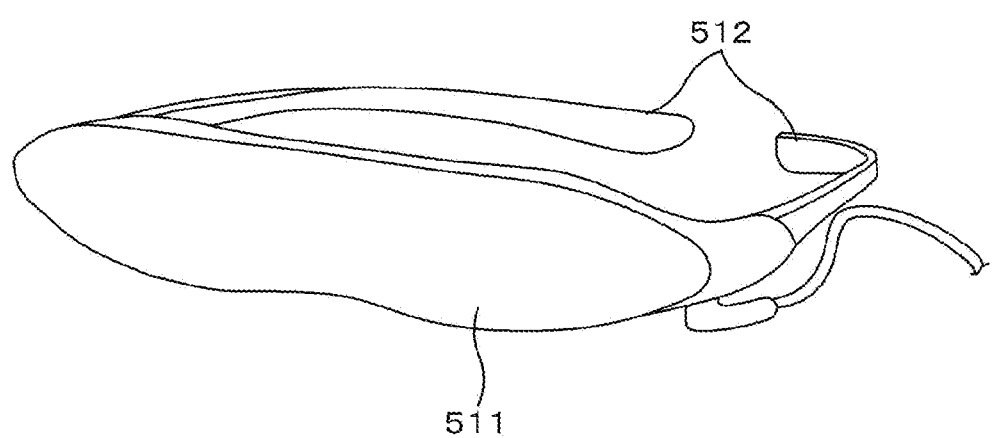
FIG. 35 is an appearance diagram of a head-mounted display.

FIG. 35 is an appearance diagram of the head-mounted display. The head-mounted display includes, on both sides of eyeglass-shaped display section 511, an ear hooking portion 512 for mounting the head-mounted display on the head of a user. In this head-mounted display, the liquid crystal display element of the present disclosure can be used as the display section 511. In other words, the head-mounted display according to the present example is produced by using the liquid crystal display element of the present disclosure as the display section 511.

Specific Example 4

Figure 36:
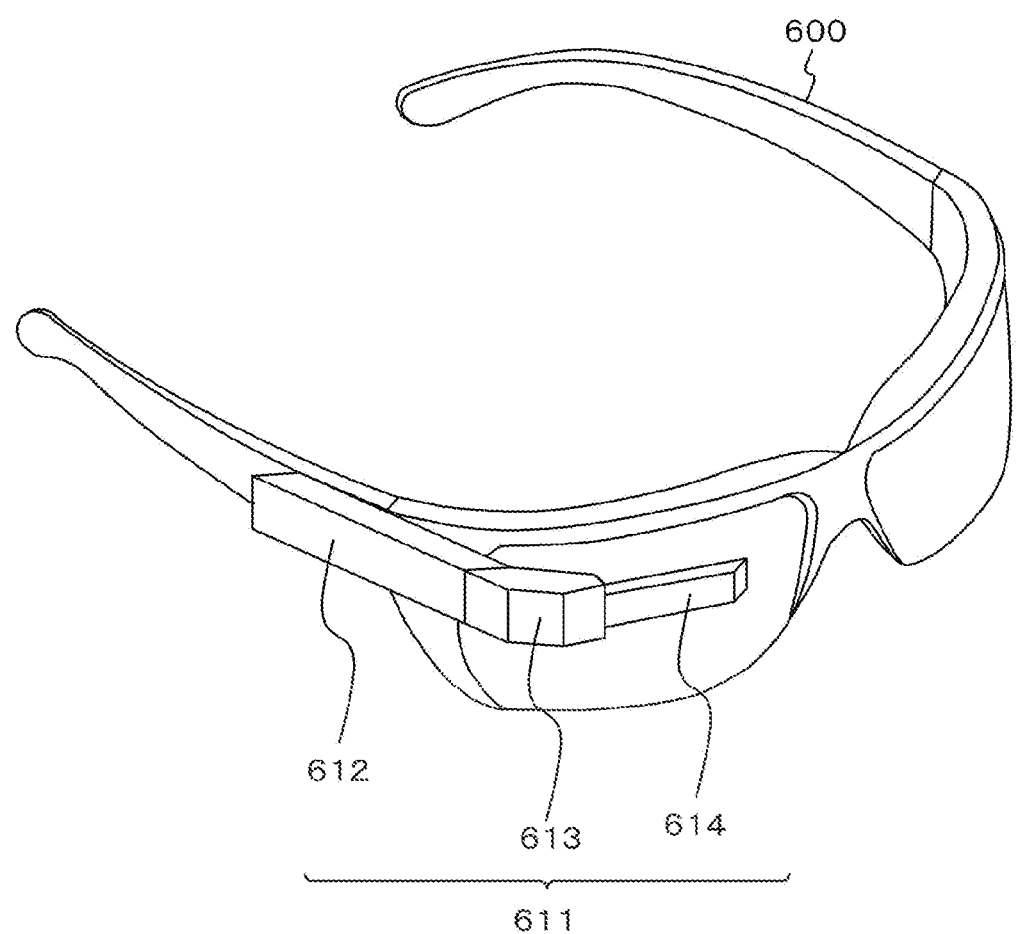
FIG. 36 is an appearance diagram of a see-through head-mounted display.

FIG. 36 is an appearance diagram of a see-through head-mounted display. A see-through head-mounted display 611 includes a main body portion 612, an arm 613, and a lens barrel 614.

The main body portion 612 is connected to the arm 613 and eyeglasses 600. Specifically, a long side direction end of the main body portion 612 is coupled to the arm 613, and one side of a side surface of the main body portion 612 is coupled to the eyeglasses 600 via a connection member. Note that the main body portion 612 may be mounted directly on the head of a human being.

The main body portion 612 incorporates a control substrate for controlling operations of the see-through head-mounted display 611 and a display section. The arm 613 connects the main body portion 612 to the lens barrel 614 to support the lens barrel 614. Specifically, the arm 613 is coupled to each of an end of the main body portion 612 and an end of the lens barrel 614 to fix the lens barrel 614. Additionally, the arm 613 incorporates a signal line for communicating data related to images provided from the main body portion 612 to the lens barrel 614.

The lens barrel 614 projects image light provided from the main body portion 612 via the arm 613, through an ocular lens toward the eyes of a user wearing the see-through head-mounted display 611. In the see-through head-mounted display 611, the liquid crystal display element of the present disclosure can be used as the display section of the main body portion 612.

[Miscellaneous]

Note that the technique of the present disclosure can take the following configurations.

[A1]

An electrode structure including:

a light reflection film;

an insulating film formed on the light reflection film; and a transparent conductive film formed on the insulating film, in which the transparent conductive film is divided into pieces in a two-dimensional matrix at a predetermined pitch to form transparent pixel electrodes, and each of the transparent pixel electrodes is connected to a corresponding one of drive electrodes formed in a lower layer underlying the light reflection film, through a corresponding one of vias penetrating the insulating film and the light reflection film and insulated from the light reflection film.

[A2]
The electrode structure according to [A1] described above, in which the light reflection film is formed as a continuous common layer.

[A3]
The electrode structure according to [A1] described above, in which the light reflection film is divided into strip-like pieces corresponding to a group of the transparent pixel electrodes arranged in a row direction.

[A4]
The electrode structure according to any one of [A1] to [A3] described above, in which the light reflection film is formed to be electrically floating.

[A5]
The electrode structure according to [A1] described above, in which the light reflection film is connected to an electrode for voltage supply formed in a lower layer underlying the light reflection film.

[A6]
The electrode structure according to [A5] described above, in which the electrode structure is formed on a substrate forming a back panel of a reflective liquid crystal display element, and the electrode for voltage supply is supplied with a voltage via a switching transistor provided on the substrate.

[A7]
The electrode structure according to [A5] or [A6] described above, in which the light reflection film is formed as a continuous common layer and supplied with a voltage from the electrode for voltage supply.

[A8]
The electrode structure according to [A5] or [A6] described above, in which the light reflection film is divided into strip-like pieces corresponding to a group of the transparent pixel electrodes arranged in the row direction, and the strip-like pieces are connected to separately provided respective electrodes for voltage supply and supplied with respective separate voltages.

[A9]
The electrode structure according to any one of [A1] to [A8] described above, in which a dielectric film is formed on an entire surface including surfaces of the transparent pixel electrodes.

[A10]
The electrode structure according to [A9] described above, in which planarization treatment is performed to reduce level differences in the dielectric film.

[A11]
The electrode structure according to any one of [A1] to [A10] described above, in which a transparent pixel electrode-side portion of the via includes a light-reflective conductive material.

[B1]
A method for manufacturing an electrode structure, the electrode structure including
a light reflection film,
an insulating film formed on the light reflection film, and
a transparent conductive film formed on the insulating film,
the method including:
a step of forming the light reflection film, the insulating film formed on the light reflection film, and the transparent conductive film formed on the insulating film;
a step of dividing the transparent conductive film into pieces in a two-dimensional matrix at a predetermined pitch to form transparent pixel electrodes; and a step of forming vias penetrating the insulating film and the light reflection film and insulated from the light reflection film, each of the vias being used to connect a corresponding one of the transparent pixel electrodes to a corresponding one of wires formed in a lower layer underlying the light reflection film.

[B2]
The method for manufacturing an electrode structure according to [B1] described above, in which steps executed after formation of the light reflection film are executed with a predetermined voltage supplied to the light reflection film.

[B3]
The method for manufacturing an electrode structure according to [B1] or [B2] described above, in which the light reflection film is formed as a continuous common layer.

[B4]
The method for manufacturing an electrode structure according to [B1] or [B2] described above, in which the light reflection film is divided and formed into strip-like pieces corresponding to a group of the transparent pixel electrodes arranged in a row direction.

[B5]
The method for manufacturing an electrode structure according to any one of [B1] to [B4] described above, in which the light reflection film is formed to be electrically floating.

[B6]
The method for manufacturing an electrode structure according to any one of [B1] to [B5] described above, in which the light reflection film is formed to be connected to an electrode for voltage supply formed in a lower layer underlying the light reflection film.

[C1]
A liquid crystal display element including:
a front panel;
a back panel disposed opposite to the front panel; and
a liquid crystal material layer sandwiched between the front panel and the back panel,
in which, on a substrate forming the back panel,
an electrode structure is configured that includes
a light reflection film,
an insulating film formed on the light reflection film, and
a transparent conductive film formed on the insulating film,
the transparent conductive film is divided into pieces in a two-dimensional matrix at a predetermined pitch to form transparent pixel electrodes, and
each of the transparent pixel electrodes is connected to a corresponding one of wires formed in a lower layer underlying the light reflection film, through a corresponding one of vias penetrating the insulating film and the light reflection film and insulated from the light reflection film.

[C2]
The liquid crystal display element according to [C1] described above, in which the light reflection film is formed as a continuous common layer.

[C3]
The liquid crystal display element according to [C1] described above, in which the light reflection film is divided into strip-like pieces corresponding to a group of the transparent pixel electrodes arranged in a row direction.

[C4]
The liquid crystal display element according to any one of [C1] to [C3] described above, in which the light reflection film is formed to be electrically floating.

[C5]

The liquid crystal display element according to [C1] described above, in which the light reflection film is connected to an electrode for voltage supply formed in a lower layer underlying the light reflection film.

[C6]

The liquid crystal display element according to [C5] described above, in which the liquid crystal display element is formed on a substrate forming a back panel of a reflective liquid crystal display element, and the electrode for voltage supply is supplied with a voltage via a switching transistor provided on the substrate.

[C7]

The liquid crystal display element according to [C5] or [C6] described above, in which the light reflection film is formed as a continuous common layer and supplied with a voltage from the electrode for voltage supply.

[C8]

The liquid crystal display element according to [C5] or [C6] described above, in which the light reflection film is divided into strip-like pieces corresponding to a group of the transparent pixel electrodes arranged in the row direction, and the strip-like pieces are connected to separately provided respective electrodes for voltage supply and supplied with respective separate voltages.

[C9]

The liquid crystal display element according to any one of [C1] to [C8] described above, in which a dielectric film is formed on an entire surface including surfaces of the transparent pixel electrodes.

[C10]

The liquid crystal display element according to [C9] described above, in which planarization treatment is performed to reduce level differences in the dielectric film.

[C11]

The liquid crystal display element according to any one of [C1] to [C10] described above, in which a transparent pixel electrode-side portion of the via includes a light-reflective conductive material.

[D1]

A method for driving a liquid crystal display element, the liquid crystal display including
 a front panel,
 a back panel disposed opposite to the front panel, and
 a liquid crystal material layer sandwiched between the front panel and the back panel,
  on a substrate forming the back panel,
  an electrode structure being configured that includes
  a light reflection film,
  an insulating film formed on the light reflection film, and
  a transparent conductive film formed on the insulating film,
  the transparent conductive film being divided into pieces in a two-dimensional matrix at a predetermined pitch to form transparent pixel electrodes,
  each of the transparent pixel electrodes being connected to a corresponding one of wires formed in a lower layer underlying the light reflection film, through a corresponding one of vias penetrating the insulating film and the light reflection film and insulated from the light reflection film,
  wherein the light reflection film is connected to an electrode for voltage supply formed in a lower layer underlying the light reflection film, and
  when the liquid crystal display element is driven, the light reflection film is in any one of an electrically floating state, a state in which a voltage of an electrically positive polarity is applied to the light reflection film, or a state in which a voltage of an electrically negative polarity is applied to the light reflection film.

[D2]

The method for driving a liquid crystal display element according to [D1] described above, in which the electrode for voltage supply is supplied with a voltage via a switching transistor provided on the substrate.

[D3]

The method for driving a liquid crystal display element according to [D1] or [D2] described above, in which the light reflection film is formed as a continuous common layer and supplied with a voltage from the electrode for voltage supply.

[D4]

The method for driving a liquid crystal display element according to [D1] or [D2] described above, in which the light reflection film is divided into strip-like pieces corresponding to a group of the transparent pixel electrodes arranged in a row direction, and the strip-like pieces are connected to separately provided respective electrodes for voltage supply and supplied with respective separate voltages.

[D5]

The method for driving a liquid crystal display element according to any one of [D1] to [D4] described above, in which a dielectric film is formed on an entire surface including surfaces of the transparent pixel electrodes.

[D6]

The method for driving a liquid crystal display element according to [D5] described above, in which planarization treatment is performed to reduce level differences in the dielectric film.

[D7]

The method for driving a liquid crystal display element according to any one of [D1] to [D6] described above, in which a transparent pixel electrode-side portion of the via includes a light-reflective conductive material.

[E1]

Electronic equipment including:
 a liquid crystal display element including
 a front panel,
 a back panel disposed opposite to the front panel, and
 a liquid crystal material layer sandwiched between the front panel and the back panel,
 in which, on a substrate forming the back panel,
 an electrode structure is configured that includes
 a light reflection film,
 an insulating film formed on the light reflection film, and
 a transparent conductive film formed on the insulating film,
 the transparent conductive film is divided into pieces in a two-dimensional matrix at a predetermined pitch to form transparent pixel electrodes, and
 each of the transparent pixel electrodes is connected to a corresponding one of wires formed in a lower layer underlying the light reflection film, through a corresponding one of vias penetrating the insulating film and the light reflection film and insulated from the light reflection film.

[E2]

The electronic equipment according to [E1] described above, in which the light reflection film is formed as a continuous common layer.

[E3]

The electronic equipment according to [E1] described above, in which the light reflection film is divided into strip-like pieces corresponding to a group of the transparent pixel electrodes arranged in a row direction.

[E4]

The electronic equipment according to any one of [E1] to [E3] described above, in which the light reflection film is formed to be electrically floating.

[E5]

The electronic equipment according to [E1] described above, in which the light reflection film is connected to an electrode for voltage supply formed in a lower layer underlying the light reflection film.

[E6]

The electronic equipment according to [E5] described above, in which the electronic equipment is formed on a substrate forming a back panel of a reflective liquid crystal display element, and the electrode for voltage supply is supplied with a voltage via a switching transistor provided on the substrate.

[E7]

The electronic equipment according to [E5] or [E6] described above, in which the light reflection film is formed as a continuous common layer and supplied with a voltage from the electrode for voltage supply.

[E8]

The electronic equipment according to [E5] or [E6] described above, in which the light reflection film is divided into strip-like pieces corresponding to a group of the transparent pixel electrodes arranged in the row direction, and the strip-like pieces are connected to separately provided respective electrodes for voltage supply and supplied with respective separate voltages.

[E9]

The electronic equipment according to any one of [E1] to [E8] described above, in which a dielectric film is formed on an entire surface including surfaces of the transparent pixel electrodes.

[E10]

The electronic equipment according to [E9] described above, in which planarization treatment is performed to reduce level differences in the dielectric film.

[E11]

The electronic equipment according to any one of [E1] to [E10] described above, in which a transparent pixel electrode-side portion of the via includes a light-reflective conductive material.

REFERENCE SIGNS LIST 1, 2, 3, 9 . . . Liquid crystal display element
10 . . . Pixel array section
11 . . . Pixel
20 . . . Horizontal drive circuit
30 . . . Vertical drive circuit
40 . . . Light source section
50 . . . Illumination optical system
60 . . . Image control circuit
70 . . . Projection optical system
80 . . . Screen
100, 100A, 100B, 100C, 100D, 100E, 100F, 100G . . . Back panel
101 . . . Substrate
102 . . . Drive electrode
103 . . . Planarization film
104 . . . Light reflection film
105 . . . Insulating film
106 . . . Insulating film
107 . . . Via
107A . . . Conductive material layer
108 . . . Transparent pixel electrode
108A . . . Transparent conductive film
109 . . . Dielectric film
110, 111 . . . Mask layer
112 . . . Filling portion
120 . . . Liquid crystal material layer
121 . . . Seal portion
130 . . . Front panel
131 . . . Substrate
132 . . . Counter electrode
133 . . . Dielectric film
200 . . . Back panel
202 . . . Electrode for voltage supply
203 . . . Contact plug
203A . . . Conductive material layer
411 . . . Camera main body portion
412 . . . Image capturing lens unit
413 . . . Grip portion
414 . . . Monitor
415 . . . View finder
511 . . . Eyeglass-shaped display section
512 . . . Ear hooking portion
600 . . . Eyeglasses
611 . . . See-through head-mounted display
612 . . . Main body portion
613 . . . Arm
614 . . . Lens barrel
903 . . . Planarization film
908 . . . Pixel Electrode

The invention claimed is:

1. An electrode structure, comprising:
a light reflection film;
an insulating film on the light reflection film; and
a transparent conductive film on the insulating film, wherein
the transparent conductive film comprises a plurality of pieces in a two-dimensional matrix,
the plurality of pieces corresponds to a plurality of transparent pixel electrodes at a specific pitch,
each of the plurality of transparent pixel electrodes is connected to a corresponding drive electrode through a corresponding via of a plurality of vias,
each of the plurality of vias penetrates the insulating film and the light reflection film,
the drive electrode is in a lower layer that is under the light reflection film,
the insulating film is on a wall surface of each of the plurality of vias,
a material of a top portion of the plurality of vias is different from a material of a bottom portion of the plurality of vias,
the material of the top portion is a light reflective material with a specific light reflectivity, and
the bottom portion of each via is a portion associated with the drive electrode.

2. The electrode structure according to claim 1, wherein the light reflection film is a continuous common layer.

3. The electrode structure according to claim 1, wherein the light reflection film comprises a plurality of strip-like pieces corresponding to the plurality of transparent pixel electrodes arranged in a row direction.

4. The electrode structure according to claim 1, wherein the light reflection film is in a electrically floating state.

5. The electrode structure according to claim 1, wherein the light reflection film is connected to an electrode for voltage supply, and the electrode for voltage supply is in the lower layer that is under the light reflection film.

6. The electrode structure according to claim 5, wherein the electrode structure is on a substrate that corresponds to a back panel of a reflective liquid crystal display element,
the electrode for voltage supply is supplied with a voltage through a switching transistor, and
the switching transistor is on the substrate.

7. The electrode structure according to claim 5, wherein the light reflection film is a continuous common layer supplied with a voltage from the electrode for voltage supply.

8. The electrode structure according to claim 5, wherein the light reflection film comprises a plurality of strip-like pieces corresponding to the plurality of transparent pixel electrodes arranged in a row direction, and
each of the plurality of strip-like pieces is supplied with a separate voltage through a corresponding electrode of a plurality of electrodes for voltage supply connected to each of the plurality of strip-like pieces.

9. The electrode structure according to claim 1, wherein a dielectric film is on an entire surface that includes surfaces of the plurality of transparent pixel electrodes.

10. The electrode structure according to claim 9, wherein reduction in level differences in the dielectric film is based on planarization treatment.

11. The electrode structure according to claim 1, wherein a transparent pixel electrode-side portion of each via includes a light-reflective conductive material.

12. A liquid crystal display element, comprising:
a front panel;
a back panel opposite to the front panel; and
a liquid crystal material layer sandwiched between the front panel and the back panel, wherein, on a substrate corresponding to the back panel, an electrode structure is configured that includes:
a light reflection film;
an insulating film on the light reflection film; and
a transparent conductive film on the insulating film, wherein
the transparent conductive film comprises a plurality of pieces in a two-dimensional matrix,
the plurality of pieces corresponds to a plurality of transparent pixel electrodes at a specific pitch,
each of the plurality of transparent pixel electrodes is connected to a corresponding drive electrode through a corresponding via of a plurality of vias,
each of the plurality of vias penetrates the insulating film and the light reflection film,
the drive electrode is in a lower layer that is under the light reflection film,
the insulating film is on a wall surface of each of the plurality of vias,
a material of a top portion of the plurality of vias is different from a material of a bottom portion of the plurality of vias,
the material of the top portion is a light reflective material with a specific light reflectivity, and
the bottom portion of each via is a portion associated with the drive electrode.

13. An electronic equipment, comprising:
a liquid crystal display element including
a front panel;
a back panel opposite to the front panel; and
a liquid crystal material layer sandwiched between the front panel and the back panel, wherein, on a substrate corresponding to the back panel, an electrode structure is configured that includes:
a light reflection film;
an insulating film on the light reflection film; and
a transparent conductive film on the insulating film, wherein
the transparent conductive film comprises a plurality of pieces in a two-dimensional matrix,
the plurality of pieces corresponds to a plurality of transparent pixel electrodes at a specific pitch,
each of the plurality of transparent pixel electrodes is connected to a corresponding drive electrode through a corresponding via of a plurality of vias,
each of the plurality of vias penetrates the insulating film and the light reflection film,
the drive electrode is in a lower layer that is under the light reflection film,
the insulating film is on a wall surface of each of the plurality of vias,
a material of a top portion of the plurality of vias is different from a material of a bottom portion of the plurality of vias,
the material of the top portion is a light reflective material with a specific light reflectivity, and
the bottom portion of each via is a portion associated with the drive electrode.

14. A method for manufacturing an electrode structure, the method comprising:
in the electrode structure that includes a light reflection film, an insulating film, and a transparent conductive film:
forming the light reflection film;
forming the insulating film on the light reflection film;
forming the transparent conductive film on the insulating film;
dividing the transparent conductive film into a plurality of pieces in a two-dimensional matrix, wherein the plurality of pieces corresponds to a plurality of transparent pixel electrodes at a specific pitch; and
forming a plurality of vias penetrating each of the insulating film and the light reflection film, wherein
each of the plurality of transparent pixel electrodes is connected to a corresponding drive electrode through a corresponding via of the plurality of vias,
the drive electrode is in a lower layer underlying the light reflection film,
the insulating film is on a wall surface of each of the plurality of vias,
a material of a top portion of the plurality of vias is different from a material of a bottom portion of the plurality of vias,
the material of the top portion is a light reflective material with a specific light reflectivity, and
the bottom portion of each via is a portion associated with the drive electrode.

15. The method for manufacturing an electrode structure according to claim 14, wherein a predetermined voltage is supplied to the light reflection film after formation of the light reflection film.

16. A method for driving a liquid crystal display element, the method comprising:
in the liquid crystal display that includes:
a front panel;
a back panel opposite to the front panel; and a liquid crystal material layer sandwiched between the front panel and the back panel, wherein on a substrate corresponding to the back panel, an electrode structure is configured that includes a light reflection film, an insulating film, and a transparent conductive film:

forming the light reflection film;

forming the insulating film on the light reflection film;

forming the transparent conductive film on the insulating film;

dividing the transparent conductive film into a plurality of pieces in a two-dimensional matrix, wherein the plurality of pieces corresponds to a plurality of transparent pixel electrodes at a specific pitch;

forming a plurality of vias penetrating each of the insulating film and the light reflection film, wherein
- each of the plurality of transparent pixel electrodes is connected to a corresponding drive electrode through a corresponding one of via of a plurality of vias,
- each of the plurality of vias penetrates the insulating film and the light reflection film,
- the drive electrode is in a lower layer that is under the light reflection film,
- the insulating film is on a wall surface of each of the plurality of vias,
- a material of a top portion of the plurality of vias is different from a material of a bottom portion of the plurality of vias,
- the material of the top portion is a light reflective material with a specific light reflectivity, and
- the bottom portion of each via is a portion associated with the drive electrode; and connecting the light reflection film to an electrode for voltage supply, wherein
- the electrode for voltage supply is in the lower layer that is under the light reflection film, and
- when the liquid crystal display element is driven, the light reflection film is in one of an electrically floating state, a state in which a voltage of an electrically positive polarity is applied to the light reflection film, or a state in which a voltage of an electrically negative polarity is applied to the light reflection film.

17. The method for driving a liquid crystal display element according to claim 16, wherein the electrode for voltage supply is supplied with a voltage through a switching transistor on the substrate.

18. The method for driving a liquid crystal display element according to claim 16, wherein
the light reflection film is a continuous common layer, and
the light reflection film is supplied with a voltage from the electrode for voltage supply.

19. The method for driving a liquid crystal display element according to claim 16, wherein
the light reflection film comprises a plurality of strip-like pieces corresponding to the plurality of transparent pixel electrodes arranged in a row direction, and
each of the plurality of strip-like pieces is supplied with a separate voltage through a corresponding electrode of a plurality of electrodes for voltage supply connected to each of the plurality of strip-like pieces.

* * * * *